(12) United States Patent
Deleeuw et al.

(10) Patent No.: US 9,451,578 B2
(45) Date of Patent: Sep. 20, 2016

(54) TEMPORAL AND SPATIAL BOUNDING OF PERSONAL INFORMATION

(71) Applicant: Intel Corporation, Santa Clara, CA (US)

(72) Inventors: William C. Deleeuw, Beaverton, OR (US); Ned M. Smith, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 14/294,345

(22) Filed: Jun. 3, 2014

(65) Prior Publication Data

US 2015/0351068 A1    Dec. 3, 2015

(51) Int. Cl.
| | | |
|---|---|---|
| H04W 24/00 | (2009.01) | |
| H04W 64/00 | (2009.01) | |
| H04L 29/08 | (2006.01) | |
| H04W 4/02 | (2009.01) | |

(52) U.S. Cl.
CPC .............. *H04W 64/00* (2013.01); *H04L 67/18* (2013.01); *H04W 4/02* (2013.01)

(58) Field of Classification Search
USPC ....................................................... 455/456.1
See application file for complete search history.

(56) References Cited

U.S. PATENT DOCUMENTS

| | | | |
|---|---|---|---|
| 6,687,375 B1 | 2/2004 | Matyas, Jr. et al. | |
| 6,795,808 B1 * | 9/2004 | Strubbe | G06F 17/30702 |
| | | | 704/270 |
| 8,027,842 B2 * | 9/2011 | Creamer | G10L 17/26 |
| | | | 379/88.02 |
| 8,560,587 B2 * | 10/2013 | Schneider | G06F 7/582 |
| | | | 708/250 |
| 2006/0116990 A1 * | 6/2006 | Margolus | G06F 17/30949 |
| 2008/0022134 A1 | 1/2008 | Wang | |
| 2008/0269958 A1 * | 10/2008 | Filev | B60W 50/10 |
| | | | 701/1 |
| 2009/0323972 A1 | 12/2009 | Kohno et al. | |
| 2010/0199098 A1 | 8/2010 | King | |
| 2011/0131459 A1 | 6/2011 | Tu et al. | |
| 2011/0179011 A1 | 7/2011 | Cardno et al. | |
| 2011/0283190 A1 * | 11/2011 | Poltorak | G10L 13/033 |
| | | | 715/716 |

(Continued)

FOREIGN PATENT DOCUMENTS

| | | |
|---|---|---|
| CN | 103477672 A | 12/2013 |
| KR | 20090024804 A | 3/2009 |

(Continued)

OTHER PUBLICATIONS

Estimote, Inc., "API Documentation", Estimote for Developers, retrieved on Aug. 18, 2014, 6 pages. web page available at: http://estimote.com/api/index.html.

(Continued)

*Primary Examiner* — Ankur Jain
(74) *Attorney, Agent, or Firm* — Jordan IP Law, LLC

(57) ABSTRACT

Apparatus, systems, and/or methods to temporally and spatially bound personal information. A pseudo random number corresponding to time based on a random number time seed and generate a pseudo random number corresponding to location based on a random number location seed may be generated. In addition, the pseudo random number corresponding to time may be mixed with the pseudo random number corresponding to location to generate a combined pseudo random number corresponding to a specific user at a specific location at a specific time. The combined pseudo random number may be used to store and/or read personal information in an anonymous manner.

23 Claims, 8 Drawing Sheets

(56) References Cited

U.S. PATENT DOCUMENTS

| | | | |
|---|---|---|---|
| 2012/0026916 A1 | 2/2012 | Ptasinski et al. | |
| 2012/0072217 A1* | 3/2012 | Bangalore | G10L 15/1807 704/243 |
| 2012/0093312 A1 | 4/2012 | Gammel et al. | |
| 2012/0179735 A1 | 7/2012 | Ferguson et al. | |
| 2013/0304781 A1* | 11/2013 | Dey | G06F 7/584 708/254 |
| 2014/0215594 A1 | 7/2014 | Lambert | |
| 2016/0012252 A1 | 1/2016 | Deleeuw et al. | |

FOREIGN PATENT DOCUMENTS

| | | |
|---|---|---|
| KR | 101182450 A | 10/2012 |
| WO | 2015099661 A1 | 7/2015 |
| WO | 2015187724 A2 | 12/2015 |

OTHER PUBLICATIONS

Gimbal, Inc. "Gimbal™ SDK for iOS Documentation", V 1.15, May 2014, 31 pages.

Deleeuw et al., "Temporal and Spatial Bounding of Personal Information", U.S. Appl. No. 14/294,345, filed Jun. 3, 2014, 64 pages.

Deleeuw, et al., "Techniques and Architecture for Anonymizing User Data", PCT Patent Application No. PCT/US2013/077519, filed on Dec. 23, 2013, 48 pages.

Deleeuw, William C., "Improving Natural Language Interactions Using Emotional Modulation", PCT Patent Application No. PCT/US2013/061678, filed on Sep. 25, 2013, 31 pages.

International Search Report and Written Opinion received for PCT Patent Application No. PCT/US2013/061678, mailed on Jun. 24, 2014, 12 pages.

International Search Report for International Application No. PCT/US2015/033822, dated Aug. 31, 2015, 3 pages.

Written Opinion of the International Search Report for International Application No. PCT/US2015/033822, dated Aug. 31, 2015, 7 pages.

International Search Report and Written Opinion for PCT Patent Application No. PCT/US2015/047464, mailed Mar. 18, 2016, 10 pages.

3GPP, "Technical Specification Group Core Network and Terminals: Numbering, addressing and identification (Release 12)", 3GPP TS 23.003 V12.3.0., Jun. 20, 2014, 90 pages.

Hamburg, Michael, "Understanding Intel's Ivy Bridge Random Number Generator", Cryptography Research, retrieved from <electronicdesign.com/learningresources/understanding-intels-ivy-bridge-random-number-generator>, Dec. 11, 2012, 4 pages.

"Pseudorandom Number Generator", Wikipedia, retrieved from <en.wikipedia.org/wiki/Pseudo_random_number_generator>, Feb. 16, 2016, 6 pages.

"Distributed Hash Table", Wikipedia, retrieved from <en.wikipedia.org/wiki/Distributed_hash_table>, Apr. 3, 2016, 8 pages.

Non-Final Office Action for U.S. Appl. No. 14/369,268, mailed Dec. 9, 2015, 15 pages.

Final Office Action for U.S. Appl. No. 14/369,268, mailed Mar. 31, 2016, 11 pages.

International Search Report and Written Opinion for PCT Patent Application No. PCT/US2013/077519, mailed Sep. 24, 2014, 10 pages.

\* cited by examiner

TEMPORAL AND SPATIAL BOUNDING OF PERSONAL INFORMATION

BACKGROUND

Embodiments generally relate to temporal and spatial bounding of personal information. More particularly, embodiments relate to generating a pseudo random number corresponding to time and a pseudo random number corresponding to location to be used to temporally and spatially bound personal information.

A conventional computer architecture may be utilized to allow mining of data related to user activity whether or not the user is aware of the use, whether or not the user grants access to the data, and so on. In addition, the conventional computer architecture may allow for the reconstruction of a location trail based on the information submitted. Information that is written may not be arbitrary, and/or may require encryption techniques that may increase relative cost and/or complexity of the conventional computer architecture. Moreover, the conventional computer architecture may be unable to grant access to information collected in the past. Additionally, records may not be shared and/or restricted based on varying location and date/time criteria.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figures 1A, 1B:
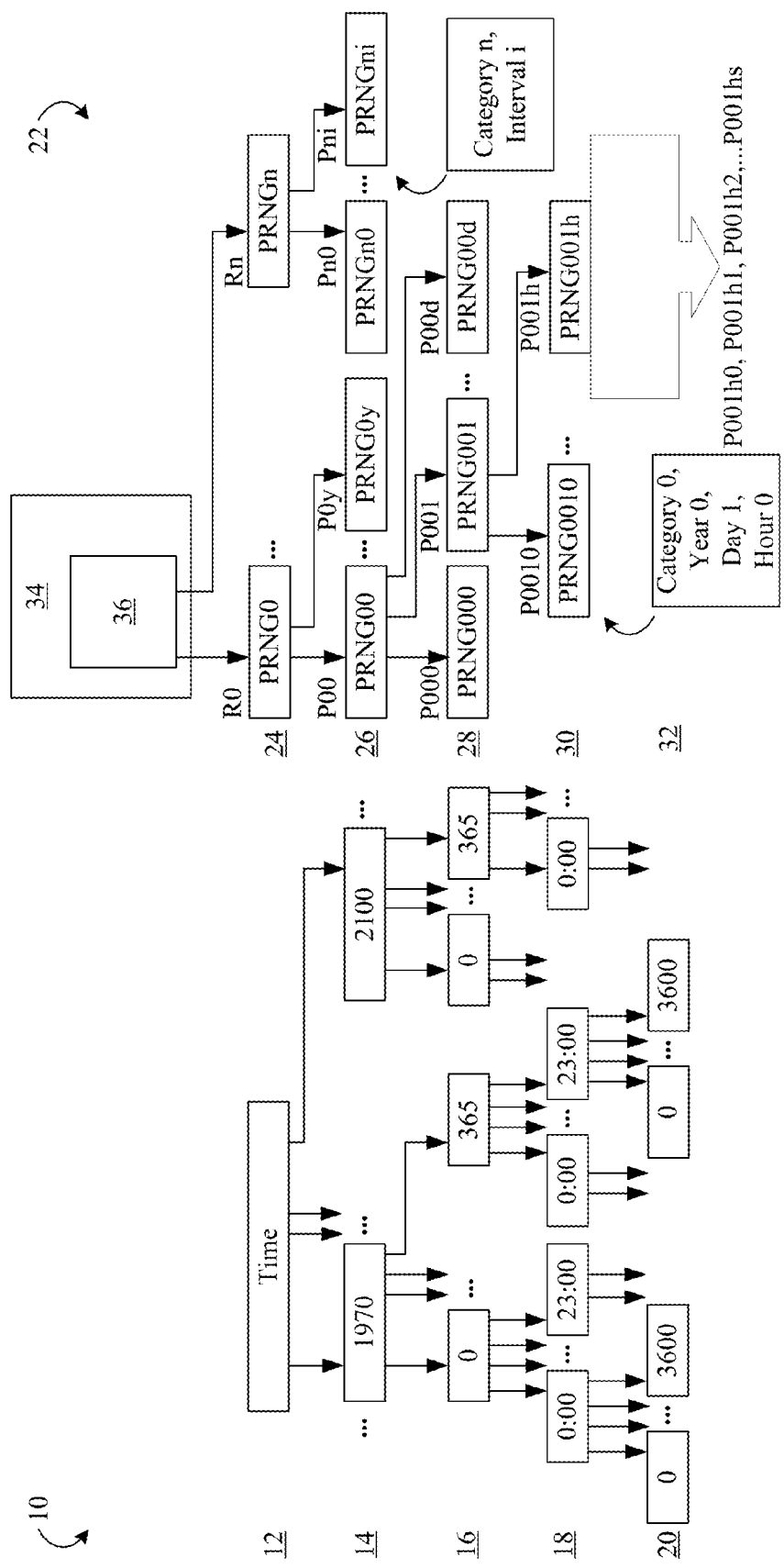
FIGS. 1A and 1B are block diagrams of example architectures to temporally bound information according to an embodiment.

FIGS. 1A to 3B show example architectures that may be used to temporally bound (time bound) and/or spatially bound (location bound) information according to an embodiment. The architectures may be generally incorporated into a platform such as a laptop, personal digital assistant (PDA), wireless smart phone, media player, imaging device, mobile Internet device (MID), any smart device such as a smart phone, smart tablet, smart TV, computer server, wearable computer, and so on, or combinations thereof. Thus, the architectures may be stored at and/or implemented by a user device (e.g., wireless smart phone, etc.), a trusted third party, a service provider, an entropy multiplexing (EM) store, and so on, or combinations thereof.

The EM store may include memory, a hard drive, a server (EM server), a table, a database, a dictionary and/or a hash table available through a web server, and so on, or combinations thereof. The EM store may maintain personal (e.g., anonymous) information for one or more users. As described below, a specific user (e.g., a submitter) may attach private meaningful information (e.g., location info, etc.) to various places in the EM store, and another user (e.g., a subscriber) may consume (e.g., read, understand, utilize, etc.) the meaningful information from the submitter by retrieving the information from the EM store. The EM store may also store public information accessible by a plurality of users that may be consumed to determine, for example, an agreed to logical structure for time, location, and so on, or combinations thereof.

Accordingly, the EM store may provide an enormous sparse array for storing records, with a number of potential "mailboxes" on the order of the number of atoms in the universe (e.g., $2^{256}$) since a relative majority of indexes may not be used and may not take up space. As described below, the specific user may submit a data record (e.g., optionally encrypted) to an index, where it may remain until deleted. Another user (e.g., a subscriber), knowing the relatively large index value that the submitter used to store a given record, may retrieve that record by querying (e.g., polling) the EM store for data stored at that index and/or by providing a URI to the EM store (e.g., EM server) for an alert when a specific index is written. Thus, the URI may free the subscriber from polling the EM store when waiting for a specific record to be written.

Indexes into the sparse array may be generated by the submitter using a multi-tier pseudo random number (PRN) generation architecture based on time seeds and location seeds, which represent an interval of time (e.g., a span of time) and an interval of space (e.g., an area of space), respectively, and/or which may be unique to the particular submitter. When the submitter writes anything (i.e., any information such as a single bit) to an index covered by a (unique) number sequence associated with the seeds, the subscriber may be alerted and may learn that the submitter is and/or was within a given boundary within a given period of time. PRN trees may be used to generate location seeds and time seeds that may be used to convey anonymous location information, through for example the EM server, which is bounded by both space and time. Of note, if 10 billion people used 10 addresses (e.g., PRNs used as storage addresses) each per second for a century, the chance of even one collision would be less than 1 in $2^{118}$.

Accordingly, the EM store may provide a service to one or more users. For example, the EM store may provide a cloud service that maintains and/or forwards temporally and spatially bound information to one or more users, such as an entity that is allowed access personal information (e.g., trusted third party) submitted by the author of the information (e.g., submitter). The trusted third party may be able to determine the meaning (e.g., significance) of the personal information. In one example, the trusted third party may include a friend of a submitter, and therefore the EM store may operate as a service provider to provide a location sharing service among clients, although the EM store may not be able to determine the meaning (e.g., significance) of the personal information. In another example, the trusted third party may include a service provider to process the information and provide a service to a client (e.g., the subscriber, another user, etc.). The service may include, for example, a traffic service, a navigation service, a taxi service, a weather service, an advanced warning service, a marketing service, a user tracking service, a location sharing service, a cloud service, a sale of information (e.g., location information, etc.) service, and so on, or combinations thereof.

The user tracking service may involve tracking a specific user at a specific location at a specific time, such as for equipment rental applications, person location applications, and so on. The user tracking service may also include and/or involve marketing services. For example, a service provider may provide a coupon to a specific user (e.g., the submitter) corresponding to a location when the user enters the location. When the specific user enters a public venue (e.g., a mall, a stadium, a plaza, a tourist area, etc.), a store in the public venue, is near an item in the location, etc., the service provider may issue a coupon to the specific user. In another example, the service provider may provide information that may be of interest to the specific user, such as marketing information (e.g., a location of a nearby restaurant), traffic information, inclement weather information, taxi information, and so on, or combinations thereof.

The trusted third party may also provide a cloud service to forward information of interest to other users. For example, the trusted third party may provide a composition and/or an analysis of present/historical anonymous data. In one example, the cloud service may include and/or involve the sale of present and/or historical anonymous location information to a service client such as a map service, a navigation service, a marketing service, and so on, or combinations thereof.

In a particular example, a user (Alice) goes to a mall and visits a store. The store would like to know when Alice is in the mall next time so they can offer her a customized coupon when she enters. Alice benefits from the coupon and is willing to let the store know when she comes to the mall next time, since it is not a relatively large amount of information and the store won't know where Alice is any time she is not at the mall. Alice does not want the store to know her whereabouts when she is not at the mall, and would like to limit her in-mall tracking to expire in two months. Alice does not want to be tracked by a location service wherever she goes.

Using multi-dimensional Entropy Multiplexing (EM), Alice may provide the store with a pair of "EM seeds" (e.g., by QR code, by near-field, etc.) that will allow the ice cream store to learn when she's in the mall. Alice may begin to place her location information on the EM server, using her unique seeds and the random numbers generated by those seeds to derive EM server addresses. Location information is submitted to those addresses via a simple "yes/no", which is a form that the EM server cannot use to correlate from point to point and/or from time to time. This makes Alice effectively untraceable and completely anonymous and while allowing the ice cream store to provide Alice with a service.

Advantageously, there may be no user account to correlate Alice's location records with each other or with her. In addition, a relatively simple server system may be utilized. Moreover, an EM server cannot reconstruct Alice's location trail based on what she submits. Further, Alice only needs to write one location indication stream to the EM service, regardless of how many subscribers may use her location. Alice may grant access to location information collected in the past. Also, Alice's records may be shared with or restricted from specific individuals based on different location and the date/time criteria. Alice only needs to write a single bit of information to indicate a time/location situation. Additionally, Alice doesn't have to write a location, but merely indicate she is "here, now" by writing something to an address.

FIGS. 1A and 1B show example architectures 10, 22 that may be used to temporally bound (e.g., time bound) information according to an embodiment. The architecture 10 includes a tree (e.g., time tree) that logically structures time in a sequence at different granularities and/or intervals, such as yearly, monthly, daily, hourly, and so on. In the illustrated example, the architecture 10 includes a plurality of levels (e.g., time levels) 12-20. The level 12 corresponds to a category of "time", the level 14 corresponds to a time interval of "years", the level 16 corresponds to a time interval of "days", the level 18 corresponds to a time interval of "hours", and the level 20 corresponds to a time interval of "seconds". Finer and/or coarser time intervals are possible. In addition, values for time need not begin with the current time and, for example, a sequence of years beginning with 1900 may progress to the current date and beyond. For a given year, an array of sequential time values may be derived from a given year value to represent the days in that year. Similarly, another array may exist, to encode hours within a given day, and so on. For example, an array of sequential time values "0" to "365" at the level 16 may be derived from a given year value "1970" at the level 14 to represent days in that year.

FIG. 1B shows the architecture 22 including a hierarchy of pseudo random number generators (PRNG) that map to various time intervals, wherein a sequence of pseudo random numbers (PRNs) may be generated to correspond to the time intervals. Given a PRNG and a unique seed value (e.g., a unique 256-bit value), the PRNG will emit an immense and repeatable sequence of numbers (e.g., 256-bit numbers) that may not reveal the seed value or produce a sequence that may reasonably be derived without the seed value. The PRNG may include software such as, for example, a /dev/random and/or /dev/urandom generator, a yarrow-based generator, an entropy gathering daemon (EGD) generator, and so on, or combinations thereof. The PRNG may also include hardware such as, for example, an INTEL® (Intel is a trademark of Intel corporation) Digital Random Number Generator (DRNG), a shift register (e.g., a linear feedback shift register, etc.), and so on, or combinations thereof. In addition, a block cipher may be implemented to generate random numbers. For example, the CTR (counter) mode of AES-256 (Advanced Encryption Standard 256 bits) may be implemented as a PRNG to generate a PRN sequence. Thus, a series of child PRNGs, representing subdivisions of a parent PRNG's relatively longer time frame, may be seeded using the PRNs generated by that parent. In the illustrated example, the architecture 22 may refer to a time-based PRNG tree (e.g., time tree) including levels 24-32 corresponding a category, granularity, interval, and so on, or combinations thereof.

The architecture 22 includes an entropy multiplexer 34 having a random number generator 36 to generate a random number R (e.g., a true random number). The random number generator 36 may include software such as, for example, a yarrow-based generator, hardware such as, for example, an INTEL® DRNG, and so on, or combinations thereof. In one example, the random number generator 36 includes an entropy source that may include a self-clocking circuit operating asynchronously and generating random bits (e.g., at approximately 3 GHz), which are combined, sampled by synchronous logic and grouped into n-bit blocks (e.g., 256-bit blocks) in a shift resister. Logic, such as online health test (OHT) logic, may check each block for failure modes of the entropy source, and logic, such as conditioning logic, may cryptographically process blocks located in an online self-tested entropy (OSTE) queue into an n-bit (e.g., 256-bit) conditioned entropy pool, wherein the pool may be used to reseed a DRNG that generates the final bits output by the DRNG.

The random number generator 36 generates a series of true random numbers R0 . . . Rn that may be used as seeds from which a random number sequence and/or series may be generated using a series of PRNGs (e.g., software, shift registers, etc.). Given a true random n-bit (e.g., 256-bit) number (e.g., R0) that is used as a time seed for a PRNG (e.g., PRNG0) at the level 24 (category "time"), one may generate a PRN (e.g., P00 . . . P0y) to represent each year for the given time seed. The PRNs representing years (e.g., P00 . . . P0y) are output to the next level 26 (interval "years"). Thus, in the illustrated example, the resolution of the intervals and/or of the level 26 is one year.

When the PRNs (e.g., P00 . . . P0y) emitted by the PRNGs (e.g., PRNG0) are each fed as a seed to a unique new PRNG (e.g., PRNG00 . . . PRNG0y) at the level 26, each of the PRNGs will emit its own sequence of n-bit (e.g., 256-bit) PRNs (e.g., P000, P001 . . . P00d) to represent each day for the given time seed. The PRNs representing days (e.g., P000, P001 . . . P00d) are output to the next level 28 (interval "days"). When the PRNs (e.g., P000, P001 . . . P00d) emitted by the PRNG (e.g., PRNG00 . . . PRNG0y) are each fed as a seed to a unique new PRNG (e.g., PRNG000, PRNG001, . . . PRNG0d) at the level 28, each of the PRNGs will emit its own sequence of n-bit (e.g., 256-bit) PRNs (e.g., P0010 . . . P001h) to represent each hour for the given time seed. The PRNs representing hours (e.g., P0010 . . . P001h) are output to the next level 30 (interval "hours"). When the PRNs (e.g., P0010 . . . P001h) emitted by the PRNGs (e.g., PRNG001) are each fed as a seed to a unique new PRNG (e.g., PRNG0010 . . . PRNG001h) at the level 30, each of the PRNG's will emit its own sequence of n-bit (e.g., 256-bit) PRNs to represent each second for the given time seed. Thus, the PRN (e.g., P001h0, P001h1, P001h2, . . . P001hs) at the level 32 may uniquely represent a time for a specific user, such as the PRN P001h0 to represent a specific time corresponding to category 0 (time), year 0, day 1, hour h, and second 0.

One example of instructions that may be implemented to generate the architecture 22 may include the following:

Let "t"=a random number assigned to be the seed for a "time PRNG tree" (e.g., R0);

Let PRNG(k)=a PRN vector generated by a PRNG for seed k;

Let Ptydhs=PRN generated in PRN tree "t", for year "y", day "d", hour "h", and second "s"; wherein, PRNG(t)=[Pt0, Pt1, Pt2, . . . Pty] (one PRN for each year within time PRNG tree "t")

PRNG(Pty)=[Pty0, Pty1, Pty2, . . . Ptyd] (one PRN for each day in year "ty")

PRNG(Ptyd)=[Ptyd0, Ptyd1, Ptyd2, . . . Ptydh] (one PRN for each hour in day "tyd")

PRNG(Ptydh)=[Ptydh0, Ptydh1, Ptydh2, . . . Ptydhs] (one PRN for each second in hour "tydh").

Thus, for example, PRNG(t)=Pt0=P00 when (t)=0 (e.g., R0) and P00 is the PRN representing year 0 for tree 0, PRNG(Pty)=Pty0=P000 when (t)=0, (y)=0, and P000 is the PRN representing year 0 and day 0 for tree 0, PRNG(Ptyd)= Ptyd0=P0010 when (t)=0, (y)=0, (d)=1 and P0010 is the PRN representing year 0, day 1, and hour 0 for tree 0, and so on.

The time PRNs may be used as a storage address to anonymously provide personal information. For example, even when a user temporally and spatially bounds personal information, described below, a time PRN that is unique to a specific user may also be used alone as a storage address to provide access to the information. In one example, a specific user may write information (e.g., location information) using only a time PRN as a storage address, wherein another user is given the time PRN (e.g., directly, via a seed to derive the PRN, etc.) to read the information at the storage address to determine that some user is at the specified location at a time represented by the time PRN.

The other user may collect/aggregate anonymous information for one or more users, and/or may provide a service based on the anonymous information such as, for example, a map service, a navigation service, a marketing service, and so on. For example, the specific user may write information indicating traffic at a specific coordinate which may be collected by the other user and analyzed for providing a service, or the service provider may recognize that various users are at the particular location at the same time (or for a relatively long amount of time) and conclude that traffic conditions exist. The specific user may also write identifying information such as, for example, their name or customer ID and/or encrypt the information to vary the degree of anonymity and/or security. Historical anonymous information may also be used as analytics to provide services.

The time PRN may also be used as a storage address that is not written to by each user, but rather is used as a storage address for public information shared by two or more users. For example, the architecture 10 may include a time tree having PRNGs, as described above for the architecture 22, wherein a time seed may be shared to decompose the architecture 10 (or part thereof), and wherein PRNs may be used as storage addresses to provide the shared information for a variety of operations. In one example, a plurality of users may each decompose the architecture 10 using a shared global seed (e.g., R) to determine a generation resolution (e.g., category, number of levels, intervals/granularity for levels, etc.) for their corresponding architectures 22. Thus, for example, a random number (e.g., R) may be used as a storage address to write the category "time" for the level 12 that may be read, to write the format for the architecture 10 (e.g., category, number of levels, intervals/granularity, etc.) that may be read, and so on, or combinations thereof. Each subsequent PRN may be used as another storage address for information describing the interval to which the PRN pertains such as, for example, the year "1970" written at the location corresponding to the PRN at the particular level, sequence, etc.

In another example, the other user may determine a meaning of a received private random number given a reference to the architecture 10 to which the private random number pertains. For example, the specific user may provide the random number (e.g., R, P, etc.) together with a "same as" statement to be used by the other user to decompose all and/or a part of the architecture 22 based on the information determined for the architecture 10. In this case, the "same as" statement may include, for example, private P00=public $P00_p$, wherein $P00_p$ may be a shared PRN for the architecture 10 for the year "1970" in the level 14. The third party may conclude that P00 in the architecture 22 corresponds to the year "1970" by, for example, predetermined knowledge regarding the meaning of the seed $P00_p$, decomposing the architecture 10 using the seed $P00_p$, reading shared information stored at an address defined by the seed $P00_p$, and so on, or combinations thereof.

Thus, the other user is able to decompose each PRN for the levels 28-32 of the architecture 22 corresponding to P00, but not for the level 24 and/or any other PRNs of the level 26, and is able to determine exactly what each child PRN from P00 corresponds to (e.g., exactly what day that P000 corresponds to for the specific user, etc.). It should be understood that any level of granularity may be provided. In addition, a "similar to" statement may be used such as, for example, private P00d . . . P001~ public $P001_p$ . . . $P00d_p$, wherein the third party may conclude that P00 corresponds to some undeterminable day in the year "1970". In addition the information to determine the resolution of a decomposition and/or the meaning of a private random number may be provided on an ad hoc basis by the specific user. For example, the specific user (e.g. the submitter) may provide the random numbers together with information indicating the logical structure/resolution for time, for location, and so on, or combinations thereof. In addition, the specific user may provide the random numbers together with information regarding the PRNG algorithm to implement, hardware to implement, and so on, or combinations thereof.

Accordingly, a recipient may recreate all PRNs and children for category 0 given R0, a recipient may only recreate a PRN tree for category 0, year 1 given P01, a recipient may only recreate PRN tree for category 0, year 0, day 1 given P001, and so on. Thus, one can derive all PRN's below a relatively higher level PRN in a tree. For example, knowing Pt23 gives one the ability to generate all of the time PRN values Pt23hs for each hour "h" and each second "s" within year 2, day 3. Similarly, knowing Pt234 gives access to just that part of all time PRN values corresponding to Pt234, for each second "s" within year 2, day 3, hour 4. Further, knowing the seed Pt2345 gives access to just that value when no PRNGs are seeded below it (e.g., the lowest level). By giving out seed values at the appropriate level of the PRNG time tree, one user can decide which subset of Pt leaf nodes another user can generate. By giving yet another user a different seed, the specific user can limit the other user's ability generate Pt leaf nodes to a completely different time period.

In one particular example, a "node" of a PRNG, which is unique to the specific user based on specific user's value of "t", are each tightly associated with a given one second time interval. If the specific user provides another user with a seed value (Ptyd) for a day, and knowledge that it represents a day (e.g., a specific day by reference to a public map, by ad hoc information, etc.), the other user may generate the child/leaf node values associated with every second within that day and know the time interval that each leaf node value represents. If the specific user gives a further user a seed value (Ptydh) for an hour, that further user can only generate child/leaf node values associated with that one hour of the specified user's information. Thus, each user may receive views of the specific user's leaf node values that are controlled by the user.

Figure 2A:
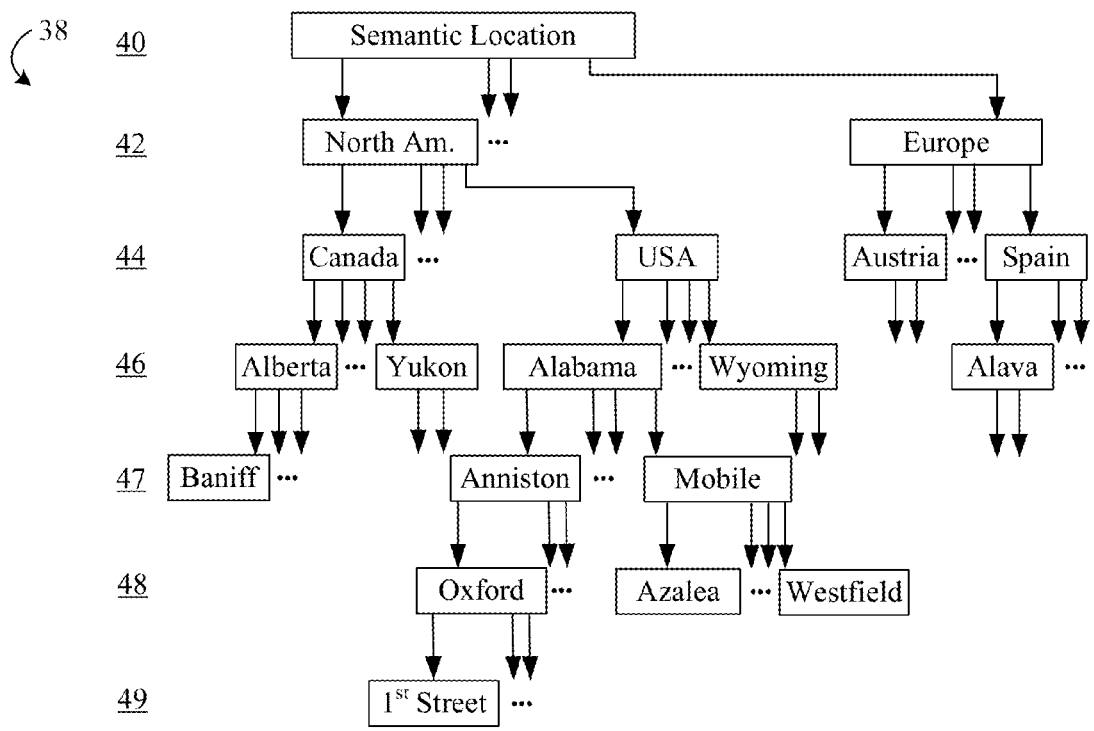
FIGS. 2A and 2B are block diagrams of example architectures to spatially bound information based on semantic location according to an embodiment.
Figure 2B:
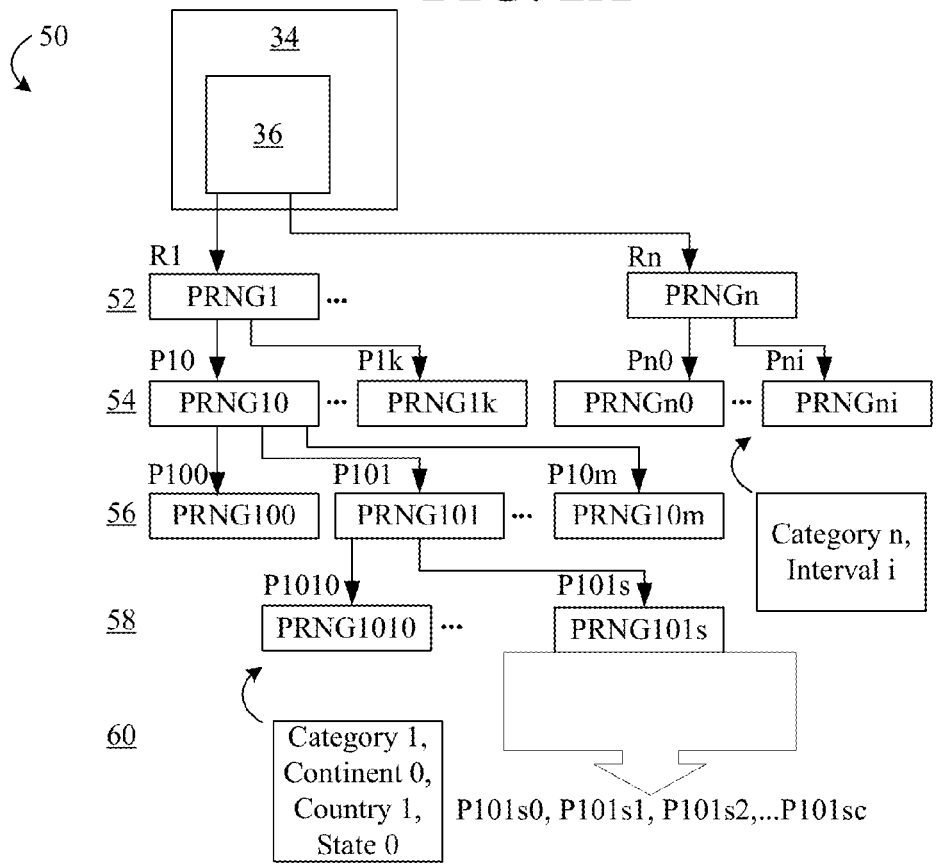

Turning now to FIGS. 2A and 2B, example architectures 38, 50 are shown that may be used to spatially bound (location bound) information according to an embodiment. The architecture 38 is similar to the architecture 10 described above and therefore may be implemented similarly, except that rather than logically structuring time the architecture 38 includes a tree (e.g., location tree) that logically structures location in a sequence at different granularities and/or intervals, such as continents, countries, states/providences, cities, neighborhood, streets, and so on. The architecture 38 includes a plurality of levels (e.g., semantic location levels) 40-49, wherein the level 40 corresponds to a category of "semantic location", the level 42 corresponds to a location interval of "continents", the level 44 corresponds to a location interval of "countries", the level 46 corresponds to a location interval of "states/providence", the level 47 corresponds to a location interval of "cities", the level 48 corresponds to a location interval of "neighborhoods", and the level 49 corresponds to a location interval of "streets". Finer and/or coarser location intervals are possible. In addition, an array of sequential location values may be derived from a given location value. For example, an array of sequential location values "Canada" . . . "USA" at the semantic location level 44 may be derived from a given continent value "North America" at the semantic location level 42 to represent the countries in the continent.

FIG. 2B shows the architecture 50 including a hierarchy of PRNGs that map to various location intervals, wherein a sequence of PRNs may be generated to correspond to the location intervals, similar to the mapping in the architecture 22 described above and therefore may be implemented similarly. Briefly, a PRNG may generate a series of PRNs representing relatively large geographical areas, such as continents. For each of these continent-level PRNs, a child of the tree may be developed to encode relatively smaller geographical areas within the continent (countries, for example). From each country, even smaller geographical areas may be derived and represented by their own PRNs. At the top level, this new tree may be represented by a 256-bit random value, R1, which is different for every person. The leaves of the tree may be all locations on the planet. The location tree trunk issues a new PRN for each country. Each country PRNG issues a new PRN for each state within that country. Continuing down, each state PRNG issues a new PRN for each city within the state. The branches of this tree might continue through neighborhoods, streets, etc. The leaf nodes of the semantic location tree could simply represent each street number on a given street within a given city and country. Other organizations are possible, wherein specific levels of detail could differ and the architecture may extend to much higher detail than neighborhood or even street number.

The architecture 50 may refer to a location-based PRNG tree (e.g., location tree) including levels 52-60 corresponding a category, granularity, interval, and so on, or combinations thereof. The architecture 50 includes the entropy multiplexer 34 having the random number generator 36, discussed above, to generate a random number (R). Given a true random n-bit (e.g., 256-bit) number (e.g., R1) that is used as a location seed for a PRNG (e.g., PRNG1) at the level 52 (category "semantic location"), one may generate a PRN (e.g., P10 . . . P1k) to represent each continent for the given location seed. The PRNs representing continents (e.g., P10 . . . P1k) are output to the next level 54 (interval "continents"). Thus, in the illustrated example, the resolution of the intervals and/or of the level 54 is one continent. When the PRNs (e.g., P10 . . . P1k) emitted by the PRNGs (e.g., PRNG1) are each fed as a seed to a unique new PRNG (e.g., PRNG10 . . . PRNG1k) at the level 54, each of the PRNGs will emit its own sequence of n-bit (e.g., 256-bit) PRNs (e.g., P100, P101 . . . P10m) to represent each country for the given location seed. The PRNs representing countries (e.g., P100, P101 . . . P10m) are output to the next level 56 (interval "states/providences"), and so on. Thus, the PRN (e.g., P101s0, P101s1, P101s2, . . . P101sc) at the level 60 may uniquely represent a location for a specific user, such as the PRN P101s0 to represent a specific location corresponding to category 1 (semantic location), continent 0, country 1, state s, and city 0.

One example of instructions that may be implemented to generate the architecture 50 may be similar to the instructions to generate the architecture 22, described above. For example, the instructions may include the following:

Let "L"=a random number assigned to be the seed for a "location PRNG tree" (e.g., R1);

Let PRNG(x)=a PRN vector generated by a PRNG for seed x;

Let PLkmscn=PRN generated in PRN tree "L", for continent "k", country "m", state/providence "s", city "c", and neighborhood "n"; wherein, PRNG(L)=[PL0, PL1, PL2, . . . PLk] (one PRN for each continent within location PRNG tree "L")

PRNG(PLk)=[PLk0, PLk1, PLk2, . . . PLkm] (one PRN for each country in continent "Lk")

PRNG(PLkm)=[PLkm0, PLkm1, PLkm2, PLkms] (one PRN for each state in country "Lkm")

PRNG(PLkms)=[PLkms0, PLkms1, PLkms2, . . . PLkmsc] (one PRN for each city in state "Lkms")

PRNG(PLkmsc)=[PLkmsc0, PLkmsc 1, PLkmsc2, . . . PLkmscn] (one PRN for each neighborhood in city "Lkmsc")

PRNG(PLkmscn)=[PLkmscn0, PLkmscn1, PLkmscn2, . . . ] (one PRN for each street in neighborhood "Lkmscn").

Thus, for example, PRNG(L)=PL0=P10 when (L)=1 (e.g., R1) and P10 is the PRN representing continent 0 for tree 1, PRNG(PLk)=PLk0=P100 when (L)=1, (k)=0 and P100 is the PRN representing continent 0 and country 0 for tree 1, PRNG(PLkm)=PLkm0=P1010 when (L)=1, (k)=0, (m)=1 and P1010 is the PRN representing continent 0, country 1, and state 0 for tree 1 (e.g., R1), and so on.

The semantic location PRNs may be used as a storage address to anonymously provide personal information, as described above for the time PRN. For example, a specific user may write information (e.g., weather information) using only a location PRN as a storage address, wherein another user is given the location PRN (e.g., directly, via a seed to derive the PRN, etc.) to read the information at the storage address to determine that some user is experiencing the specified environmental condition at a location represented by the location PRN. The other user may collect/aggregate anonymous information for one or more users, and/or may provide a service based on the anonymous information such as, for example, a weather service, a marketing service, an advanced warning service (e.g., hurricane service, etc.), and so on. For example, the other user may collect the environmental information and conclude that a particular climate exists at the particular location. The specific user may also write identifying information such as, for example, their name or customer ID and/or encrypt the information to vary the degree of anonymity and/or security. Historical anonymous information may also be used as analytics to provide services.

The location PRN may be used as a storage address that is not written to by each user, but rather is used as a storage address for public information shared by two or more users, as described above for the time PRN. In one example, a plurality of users may each decompose the architecture 38 using a shared global seed (e.g., R) to determine a generation resolution (e.g., category, number of levels, intervals/granularity for levels, etc.) for their corresponding architectures 50, as described above for the time PRN. In another example, the other user may determine a meaning of a received private random number given a reference to the architecture 38 to which the private random number pertains, as described above for the time PRN. For example, a "same as" statement may be provided such as private P100=public seed P100$_p$, wherein P100$_p$ may be a shared PRN for the architecture 40 for the country "Canada" in the level 44. In addition, a "similar to" statement such as, for example, private P101s . . . P1010 ~ public P1010$_p$ . . . P101s$_p$, wherein P1010$_p$ . . . P101s$_p$ may be shared PRNs for the architecture 38 defining some state such as "Alberta" . . . "Yukon" in the level 46. In addition, a subset of intervals may be provided. Thus, any level of granularity may be provided.

Accordingly, a node (e.g., parent/child/leaf, etc.) of a PRNG, which is unique to the specific user based on specific user's value of "L", are each tightly associated with a given location interval. If the specific user provides another user a seed value (PLkm) for a country, and knowledge that it represents a country (e.g., a specific country by reference to a public map, by ad hoc information, etc), the other user may generate the next node values (e.g., child/leaf node values) associated with every neighborhood within that country and know the location interval that each leaf node value represents. If the specific user gives a further user a seed value (PLkms) for only one state, that further user can only generate, for example, child/leaf node values associated with that one state of the specified user's information. Thus, each third party may receive views of the specific user's leaf node values that are controlled by the user.

Figure 3A:
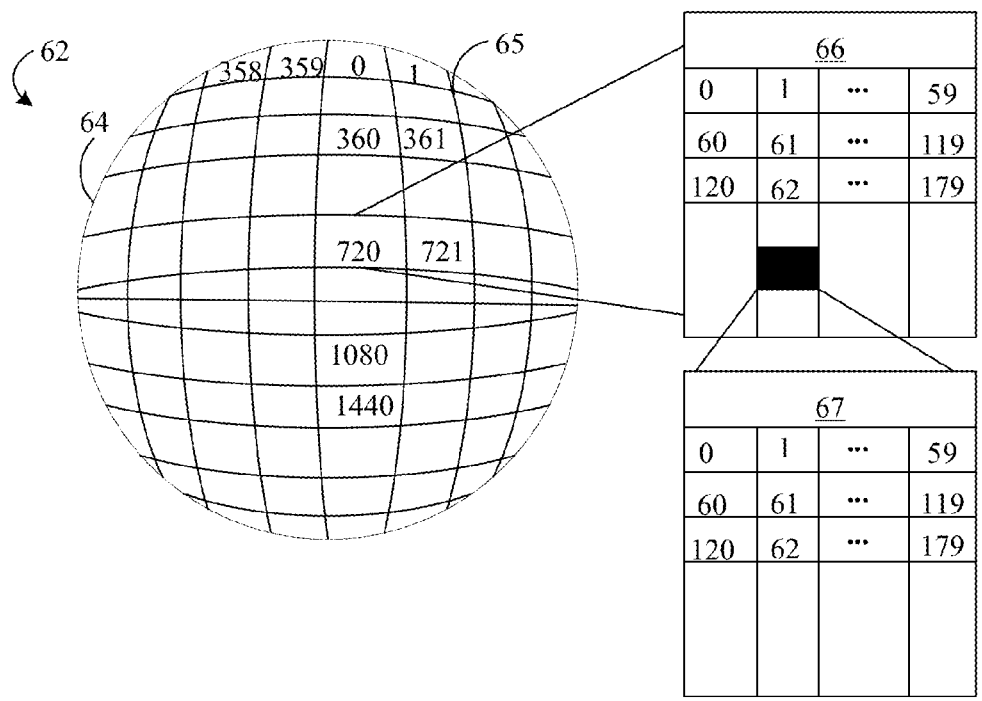
FIGS. 3A and 3B are block diagrams of example architectures to spatially bound information based on global location according to an embodiment.
Figure 3B:
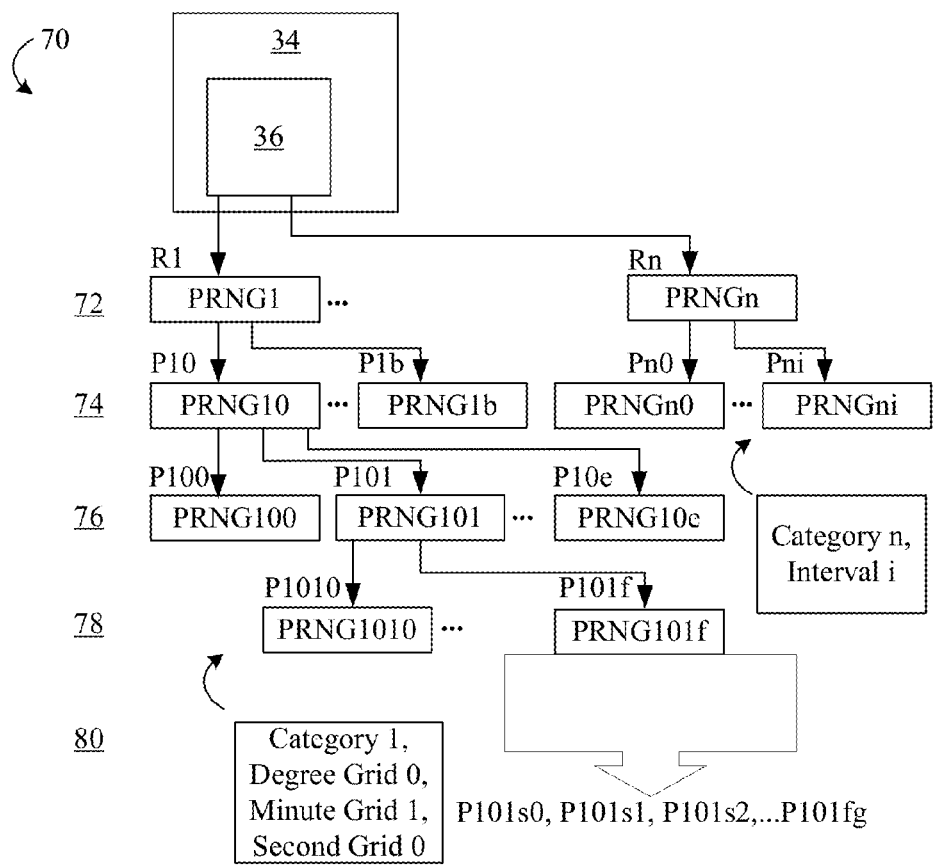

FIGS. 3A and 3B show example architectures 62, 70 that may be used to spatially bound (e.g., location bound) information according to an embodiment. The architecture 62 includes a grid (e.g., location grid) that logically structures location in a sequence at different granularities and/or intervals, such as latitude/longitude degrees, latitude/longitude arc-minutes, latitude/longitude arc-seconds, and so on. The architecture 62 includes a plurality of levels 64-68 (e.g., geographic location levels), wherein the level 64 corresponds to a category of "geographic location", the level 65 corresponds to a geographic interval of latitude/longitude degrees, the level 66 corresponds to an interval of "arc minutes", and the level 67 corresponds to an interval of "arc seconds". Thus, the planet Earth may be logically structured as a series of 360×360 latitude/longitude coordinates in the level 65. In addition, for a given location, an array of sequential location values may be derived from a given location value. For example, an array of sequential location values "0", "1" . . . "59" at the geographic location level 66 may be derived from a given latitude/longitude degree value "720" at the geographic location level 65 to represent arc-minutes in the given latitude/longitude degree. Similarly, an array of sequential location values "0", "1" . . . "59" at the geographic location level 67 may be derived from a given value at the location level 66 represent arc-seconds in the given latitude/longitude minute. Finer and/or coarser location intervals are possible.

FIG. 3B shows the architecture 70 including a hierarchy of PRNGs that map to various location intervals, wherein a sequence of PRNs may be generated to correspond to the location intervals similar to the mapping in the architecture 50 described above and therefore may be implemented similarly. In the illustrated example, the architecture 50 may refer to a location-based PRNG tree (e.g., location tree) including levels 72-80 corresponding a category, granularity, interval, and so on, or combinations thereof. The architecture 70 includes the entropy multiplexer 34 having the random number generator 36, described above, to generate a random number (R). Given a true random n-bit (e.g., 256-bit) number (e.g., R1) that is used as a location seed for a PRNG (e.g., PRNG1) at the level 72 (category "geographic location"), one may generate a PRN (e.g., P10 . . . P1b) to represent each latitude/longitude degree for the given location seed. The PRNs representing degrees (e.g., P10 . . . P1b) are output to the next level 74 (interval "latitude/longitude degree"). Thus, in the illustrated example, the resolution of the intervals and/or of the level 74 is one latitude/longitude degree.

When the PRNs (e.g., P10 . . . P1b) emitted by the PRNGs (e.g., PRNG1) are each fed as a seed to a unique new PRNG (e.g., PRNG10 . . . PRNG1b) at the level 74, each of the PRNGs will emit its own sequence of n-bit (e.g., 256-bit) PRNs (e.g., P100, P101 . . . P10e) to represent each latitude/longitude minute for the given location seed. The PRNs representing latitude/longitude minutes (e.g., P100, P101 . . . P10e) are output to the next level 76 (interval "latitude/longitude minutes"), and so on. Thus, the PRN (e.g., P101f0, P101f1, P101f2, . . . P101fg) at the level 80 may uniquely represent a location for a specific user, such as the PRN P101fg to represent a specific location corresponding to category 1 (geographic location), latitude/longitude degree 0, latitude/longitude minute 1, latitude/longitude second f, and latitude/longitude are milliseconds g.

Instructions that may be implemented to generate the architecture 70 may be similar to the instructions to generate the architecture 50, described above. In addition, the architectures 62, 70 may be used in the same and/or similar manner as the architectures 38, 50 described above in FIGS. 2A and 2B. For example, the geographic location PRNs may in utilized in a similar manner as the semantic location PRNs, discussed above. In one example, the geographic location PRNs may be used alone as storage addresses to write personal information. In another example, the architecture 62 may be used to decompose the architecture 70, described above. In addition, it should be understood that a given user may deploy any combination of architectures. For example, the given user may deploy both a semantic location tree and a geographic location tree wherein, for example, R1 may be a random location seed corresponding to semantic location and R2 may be a different random location seed corresponding to geographic location. Thus, a user may have the flexibility to implement any time and/or location parameters to achieve same and/or similar functionality.

Figure 4:
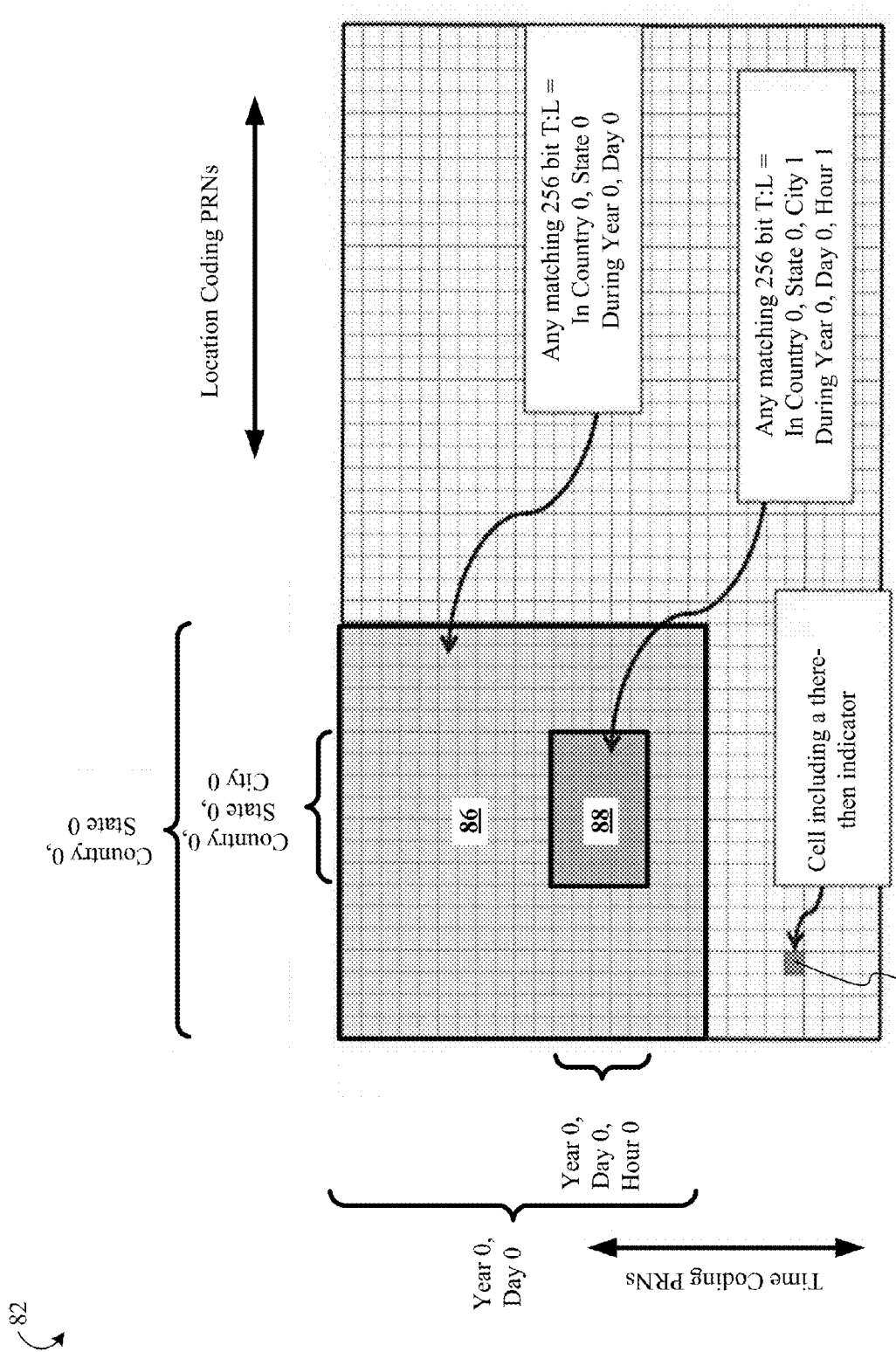
FIG. 4 is an example of a matrix representing a mixing function to temporally and spatially bound information according to an embodiment.

Turning now to FIG. 4, an example of a matrix 82 to represent a mixing function to temporally and spatially bound information is shown according to an embodiment. The matrix 82 may include any coordinate system, such as Cartesian coordinates (e.g., X, Y, Z), polar coordinates, (e.g., radial, angular), and so on, or combinations thereof. Thus, it should be understood that the matrix 82 may include an n-dimensional (e.g., multi-dimensional, three-dimensional, etc.) format to represent a mixing function generating, for example, a single value from n (e.g., three, etc,) different values (e.g., from n different PRNG trees, etc.) that are mixed to generate a combined value. In the illustrated example, the matrix 82 includes a two-dimensional (2D) format to represent a mixing function to mix time values and location values.

In one example, values from the time-based PRNG tree (FIG. 1B), discussed above, and values from the location-based PRNG tree (FIG. 2B), discussed above, may be used together in the matrix 82 to pin-point a cell corresponding to a specific time and place for a specific user. Thus, the Y coordinate of the matrix 82 may represent time PRNs and the X coordinate of the matrix 82 may represent location PRNs, wherein each cell of the matrix 82 may be designated for a combined PRN resulting from multi-dimensional (e.g., time/space, etc.) entropy multiplexing. The combined PRN may indicate that a specific user is at a specific time at a specific place, useful for a service such as a user tracking service, a location sharing service, a cloud service, a sale of location information service, and so on, or combinations thereof.

A specific user (e.g., a submitter) may generate a node (e.g., child, leaf) value from the user's own time PRNG tree "t" representing a specific time. For example, the specific user may generate nodes values Ptyd0, Ptyd1, Ptyd2, . . . Ptydh for each hour in a day "tyd" with a time seed Ptyd, described above. Similarly, the specific user may generate a node value from the user's own semantic location PRNG tree "L" representing a specific location. For example, the user may generate node values PLkmsc0, PLkmsc 1, PLkmsc 2, . . . PLkmscn for each neighborhood in a city "Lkmsc" with a location seed PLkmsc, described above. To temporally and spatially bound personal information, the user may generate an array of combined PRNs by mixing the node values to determine combined values corresponding to a particular time interval (e.g., day "tyd") and a particular location interval (e.g., city "Lkmsc"). Instructions to mix PRNs may include, for example:

Let H(a,b)=an n-bit (e.g., 256-bit) mixing function, wherein the mixing function may include an exclusive-OR (XOR), a cryptographic hash, a cross product, and so on.

The mixing function may operate on a 256-bit (a) and a 256-bit (b) to produce a single 256-bit value. Of note, H does not have to be a cryptographic hash and the values of (a) and (b) may not need to be secret. In addition, by mixing a 256-bit "t" and a 256-bit "L" such that h=H(t,L), the user may generate an enormous random number "h" that uniquely identifies the user being at a specific time and place. For example, a combined PRN $h_0$=Pty0×PLkmsc1 represents that a specific user is at a specific location (e.g., neighborhood 1, city c, etc.) at a specific time (e.g., year y, day 0, etc.), a combined PRN $h_1$=Pty0×PLkmsc2 represents that the same specific user is at a specific location (e.g., neighborhood 2, city c, etc.) at a specific time (e.g., year y, day 0, etc.), and so on. In addition, each cell of the matrix 82 may be designated (e.g., assigned, linked, mapped, associated, etc.) for a different combined PRN h. For example, $cell_0$ may be designated for $h_0$, $cell_1$ may be designated for $h_1$, and so on. Thus, the matrix 82 may represent the mixing function that is used to generate values (e.g., combined PRNs) to indicate that the specific user is at a particular time at a particular location.

An EM store (e.g., EM server) may store and/or maintain personal (e.g., anonymous) information corresponding to one or more users that is written to a storage address generated by the mixing function represented by the matrix 82. For example, the specific user may register activity with the EM store by storing any information at the EM server address created by the mixing function. In one example, the combined PRN h may be used as a storage address, and the user may write any information to the storage address. The specific user may write non-arbitrary information such as identifying information (e.g., name, customer number, etc.), preference information (e.g., preference for some good sold at the location, some good sold at a particular time of day, type of information to receive, etc.), and so on, or combinations thereof. The user may encrypt the information stored to provide varying degrees of security.

The information written at the storage address may be arbitrary, wherein the presence of the arbitrary information itself indicates that the specific user is at the specific location at the specific time. For example, the combined PRN $h_0$=Pty0×PLkmsc1 may be used as a storage address that is written to when the specific user is at the specific location (e.g., neighborhood 1, city c, etc.) at the specific time (e.g., year y, day 0, etc.). The information written may be a there-then indicator bit that is set, wherein the presence of the set bit at the storage address defined by the combined PRN and represented by a cell of the matrix 82, such as for example a cell 84, itself indicates that the specific user is and/or was at the specific location at the specific time without providing any indication as to the meaning. Thus, the EM store (e.g., EM server) cannot be queried to determine what any of the numbers signify since the EM store may not have any information to determine what the addresses signify (e.g., what the PRNs mean). The EM store may only be queried to determine there are, for example, $2^{256}$ addresses that have information stored in them. Without time and location seeds and/or knowledge of what the seeds signify, all that may be determined from the EM storage is that there are bits at addresses.

Indeed, the probability of determining the meaning of the PRNs (e.g., addresses) is practically unfeasible, especially when the number of intervals at a level are relatively large. For example, a relatively large area and time window may mask the specific user from identification without the seed values and/or meaning thereof. In addition, the identity of the specific user may be masked when a number of users contributing information to the EM storage is relatively large (e.g., when a relatively large amount of people contribute time/location data to the EM storage).

The specific user may control to which entity a seed is provided and therefore may control the access to the personal information. The specific user may also control the degree of access by selectively providing the seeds. Generally, the specific user may give another user access to a day's worth of information when the user is located in a particular State by, for example, providing a time seed that represents the day on a time tree and a location seed that represents the particular State on a location tree, which when node values from the seeds are mixed generate an array of combined values (e.g., combined PRNs) that represent the specific user within the specific State within the specific day. Thus, for example, a region 86 of the matrix 82 may represent the array of values that indicate the specific user is within the specific State within the specific day (e.g., Country 0, State 0 during Year 0, Day 0).

Given those seed values, the other user may also precisely determine the array of values included in a region 88 of the matrix 82 that indicates the specific user within a specific city of the specific State within a specific hour of the specific day (e.g., Country 0, State 0, City 0 during Year 0, Day 0, Hour 0). The specific user may limit the other user's access of the personal information to a specific hour in a specific city by, for example, providing the seeds corresponding only to the values represented by the region 88 of the matrix 82. Thus, the specific user may provide a seed for the hour of that day and the seed for the State, wherein the node values from the hour seed (e.g., PRNs corresponding to seconds) are mixed with the node values for the city that are determined from the seed for the State.

In a further example, the specific user may provide a second user the time seed Pty corresponding to the year "ty" and the location seed PLkmsc corresponding to the city "Lkmsc" to allow the second user to generate all of the node values (e.g. child, leaf, etc.) and hashes (e.g., via a mix function) based on the time seed and the location seed when the specific user wishes to allow the second user to precisely know where the specific user is located within the city "Lkmsc" during the year "ty". By knowing the seed values (e.g. parent node values), the second user gains an understanding of each subsequent seed value's (e.g., child/leaf node value) meaning and, thus, may use the resultant hash to know that the specific user is at a specific place within the city to reconstruct the specific user's movement within it. Simply put, a specific user may give seed values to provide unfettered access to track the specific user in the particular time interval and the particular location interval corresponding to the seed values.

The specific user may, however, provide a first user with all combined PRNs h created by hashing all of the time node values Ptyd0, Ptyd1, Ptyd2, . . . Ptydh for each hour in the day "tyd" with all of the location node values PLkmsc0, PLkmsc 1, PLkmsc 2, . . . PLkmscn for each neighborhood in the city "Lkmsc" when the specific user wishes to allow the first user to know only if the specific user is and/or has been in the city "Lkmsc" over day "tyd", without knowing the precise path of movement over the day. The specific user may also provide the node values to allow the first user to generate the combined PRN values therefrom, without allowing the first user to know the precise meaning (e.g., to reconstruct a path of movement over the day). To enhance security, the combined PRN values h and/or the node values may be rearranged (e.g., relative to the order generated) before arriving to the first user to further mask the decomposition details of the PRNs, although determining a more specific meaning than that allowed by the specific user from the PRNs may be practically infeasible, especially when the intervals are relatively large (e.g., when there are may PRNs in each interval).

It should also be understood that the user may combine shared values from, for example, a public map with private values from, for example, a private map, to generate one or more combined PRNs that uniquely identify a specific user is at a specific location at a specific time. For example, the user may combine public time PRNs with private location PRNs to generate a set of combined PRNs for the specific user. In this case, a cryptographic hash may be implemented to vary the level of security. In addition, the user may re-arrange the public PRNs, the private PRNs, and/or the combined PRNs (e.g., relative to the order of generation) in an agreed to/negotiated fashion before and/or after applying the mixing function to vary the level of security.

The other user may query (e.g., poll) the EM store with a combined PRN value h to determine if information has been written to the storage address defined by the combined PRN. The other user may, for example, read the set indicator bit at the storage address and conclude that the specific user is and/or was at the specific location at the specific time since the service provider knows the meaning of the combined PRN (e.g., the scope/meaning of the specific time and location seeds, etc.). Polling may be accomplished utilizing encryption, such as a virtual private network (VPN) connection, a secure socket layer (SSL) connection, cryptographic encryption (e.g., secure hash algorithm, message digest algorithm, advanced encryption standard, etc.), and so on, or combinations thereof. Moreover, a subscription system may be implemented on the EM server to notify some information has been written. For example, the other user may subscribe a list of numbers (e.g., combined PRNs) to the EM server using a uniform resource locator (URL), wherein the EM server may recognize when one of the subscribed PRNs are written to and send a notification (e.g., a hyper text transfer protocol (HTTP) request) to the other user using the particular URL.

To enhance security, the other user may subscribe the set of numbers with a customer number, may utilizing encryption (e.g., a VPN, etc.), and so on, or combinations thereof.

The subscription may include a combined PRN, a URL having a web service address, instructions to notify the other user when the combined number is used, and/or identifying information for the specific user (e.g., name, customer number, etc.). The instruction used in the subscription may include the following:

For a block of addresses X-Z, use www(.)mybusiness(.)com?specificuser=A, wherein A may be a non-arbitrary indicator (e.g., name, social security number, etc.) and/or an arbitrary indicator (e.g., a customer number, etc.) and wherein X-Z may be a block of addresses (e.g., combined PRNs).

The EM server, on identifying that one or more of the addresses (e.g., combined PRNs) are written to, may notify the other user using the URL as follows:

HTTP Request: www(.)mybusiness(.)com?specificuser=A&EMaddr=X, wherein X is the combined PRN written to.

In response, the other user may determine the meaning of the address X for the specific user A, and provide a service to the specific user A. For example, the other user (e.g., a service provider) may automatically provide a coupon to the specific user. In addition, the other user may be able to build an aggregate picture of historical location data useful for analysis to provide services such, for example, marketing services, traffic services, and so on. In one example, the other user may collect the information as it is being written and store the information for present and/or future use. In another example, the other user may poll a block of combined PRNs and store the information for present and/or future use.

The other user may wait for another combined PRN of the block X-Z to be used, may poll the EM server for another combined PRN of the block X-Z, may subscribe another block of numbers, and so on, or combinations thereof. In addition, the other user may use a search rule to narrow a search (e.g., initial search, subsequent search to initial search), to narrow a notification (e.g., an initial notification, subsequent, notification). For example, a search rule may specify to poll and/or to notify for combined PRNs corresponding to the time of operation for a particular location (e.g., store hours). A search rule may specify to check for a number proximate a current time, since a specific user may write to storage in time order. Thus, the search rule may instruct to poll and/or to notify for combined PRNs corresponding to a predetermined interval around a current time rather than, for example, several hours in the future. In another example, the search rule may specify to poll for combined PRNs corresponding to a predetermined interval in the past. In a further example, the search rule may specify to notify for combined PRNs corresponding to a predetermined interval in the future.

Figure 5:
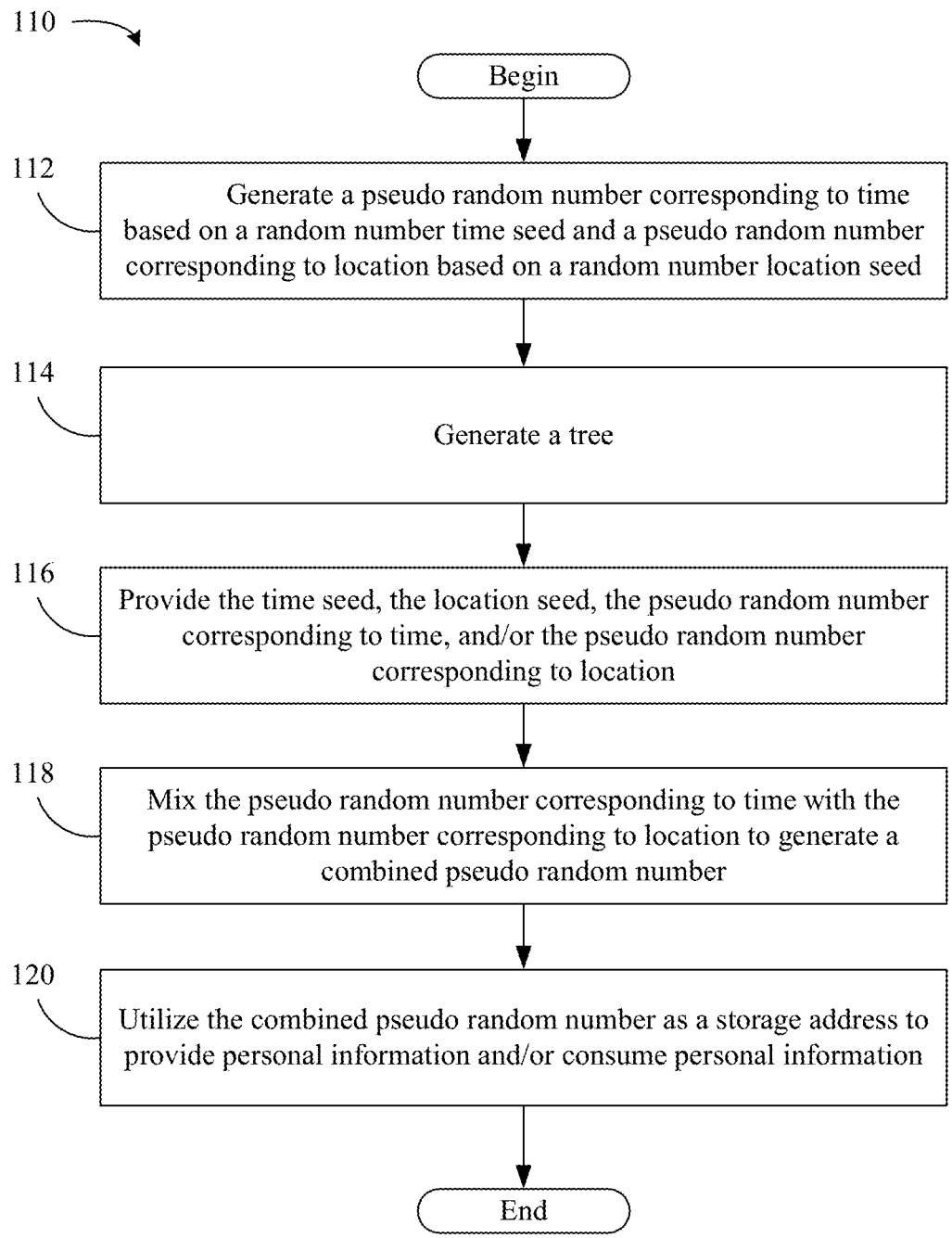
FIG. 5 is a flowchart of an example of a method to temporally and spatially bound information according to an embodiment.

FIG. 5 shows a method 110 to temporally and spatially bound information. The method 110 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 110 may be written in any combination of one or more programming languages, including an object oriented programming language such as C++ or the like and conventional procedural programming languages, such as the "C" programming language or similar programming languages. Moreover, the method 110 may be implemented using any of the herein mentioned circuit technologies.

Illustrated processing block 112 provides for generating a pseudo random number (PRN) corresponding to time (e.g., years, time zone, hours, etc.) based on a random number time seed, and generating a PRN corresponding to location (e.g., semantic location, geographic location, etc.) based on a random number location seed. The random number time seed may include a true random number (TRN) corresponding to time and a random number location seed may include a different TRN corresponding to location. The time seed and/or the location seed may also include a PRN time seed corresponding to time and/or a PRN location seed corresponding to location. For example, the TRN seed may be utilized at a top level of a tree, while the PRN seed may be utilized below the top level of the tree. A PRN corresponding to time and/or a PRN corresponding to location may be used as a storage address to write information, such as anonymous information.

Illustrated processing block 114 provides for generating a tree, such as a time tree, a location tree and so on, or combinations thereof. In one example, the time tree may include a plurality of time levels, wherein one or more PRNs are generated at each of the plurality of time levels. For example, the block 114 may generate a first PRN corresponding to time at a first time level and generate a PRN sequence based on the first PRN, wherein the PRN sequence includes two or more PRNs corresponding to time at a next time level (relative to the first level). In another example, the location tree may include a plurality of location levels, wherein one or more PRNs are generated at each level of the plurality of location levels. For example, the block 114 may generate a first PRN corresponding to location at a first location level and generate a PRN sequence based on the first PRN, wherein the PRN sequence includes two or more PRNs corresponding to location at a next location level (relative to the first level).

Illustrated processing block 116 may provide the time seed, the location seed, the PRN corresponding to time, the PRN corresponding to location, and so on, or combinations thereof. In one example, the block 116 may provide a time seed for a time interval and a location seed for a location interval, wherein a user (e.g., a device of the user, etc.) determines that a specific user (e.g., a device of the specific user which provided the data) is at a specific location at a specific time for times of the time interval and for locations of the location interval. The user receiving the data may determine the precise location at the precise time and/or a path of movement of the specific user for times of the time interval and for locations of the location interval.

The block 116 may also provide a time seed for a time interval and a PRN (e.g., a child/leaf node value) corresponding to location based on a location seed for a location interval, wherein a user (e.g., a device of the user, etc.) determines a specific user (e.g., a device of the specific user which provided the data) is at a specific location at a specific time for times of the time interval and for a general space corresponding to locations of the location interval. For example, the user receiving the data may determine that the specific user is in a State (e.g., general location) when the PRN that is provided corresponds to some city in a State without defining the precise city in the State. Thus, the user may only conclude that the user is in the State during a specific time of the time interval, but not the specific city.

When, however, the specific user wishes to allow the user to determine the specific city, the user may provide the seed PRN corresponding to the State (e.g., to decompose all of the information below the State level in the tree), the user may provide the precise meaning of the city (e.g., via a reference to a public map, via ad hoc information, etc.), and so on, or combination thereof. Accordingly, any level of control regarding access to information is possible.

A PRN corresponding to time and/or a PRN corresponding to location may be generated based on a public map shared by a plurality of users. The public map may include a logical structure of time, wherein the user may decompose a private tree using the same logical structure as the public map. In another example, the user may determine the meaning of private PRNs received based on a reference to the public map. For example, a "same as" and/or a "similar to" statement may be provided together with a private PRN to reveal the meaning/significance of the private PRN, and/or to decompose node values from the private PRN according to the logical structure of the public map. In another example, a PRN corresponding to time and/or a PRN corresponding to location may be generated based on ad hoc information for the PRN (and/or set of PRNs). Accordingly, any level of control regarding access to information is possible. Moreover, public PRN values (e.g., PRN values shared among a set of user which may be secret to another set of users) may be used to temporally and spatially bound personal information (e.g., used as values in a mixing function).

Illustrated processing block 118 provides for mixing the PRNs corresponding to time with the PRNs corresponding to location to generate a combined PRN corresponding to a specific user at a specific location at a specific time. In one example, an exclusive-OR operation, a hash operation, and/or a cross product operation may be implemented to mix the PRN corresponding to time with the PRN corresponding to location (e.g., multi-dimensional entropy multiplexing). The mix operation (e.g., mix function) may be implemented by the specific user, by the user that receives the PRNs and knows a decomposition resolution (e.g., to derive a meaning of the PRNs), and so on, or combinations thereof. In one example, the private PRNs corresponding to time and the private PRNs corresponding to location may be mixed, and the resulting values (e.g., combined PRNs) may be forwarded to another user to allow the other user to access personal information. A two-dimensional (2D) matrix format may represent a mixing function to mix, for example, time values and location values, wherein each cell of the matrix is designated for a different combined PRN temporally and spatially bounding personal information.

Illustrated processing block 120 provides for utilizing the combined PRN as a storage address to provide and/or consume personal information. For example, the specific user may write information at the storage address corresponding to the combined PRN. The information written may include, for example, user identifying information, user preference information, service-related information (e.g., traffic information, weather information, etc.), and so on, or combinations thereof. The information may also include arbitrary information such as, for example, an indicator bit. The presence of the arbitrary information itself at the storage address may indicate that the specific user is at the specific location and at the specific time.

Another user may consume information from the storage address. For example, the other user may poll a service collecting the information at the storage address (e.g., an EM server maintaining the storage information, etc.) to read information and determine if the specific user is at the specific location at the specific time. The other user may also associate the combined PRN with a uniform resource locator (URL), provide the URL to the service collecting the information at the storage address (e.g., an EM server, etc.), and/or receive a request (e.g., HTTP request) at the URL from the service to indicate the specific user is at the specific location at the specific time e.g., when the information is written at the storage address. The other user may, for example, assign a customer number to the specific user, provide the customer number and the URL to the service, receive a request from the service including the customer number and the combined PRN utilized as the storage address, and/or determine the specific user at the specific location at the specific time based on one or more of the time seed, the location seed, and the combined PRN (e.g., using the combined PRN, determine the meaning of the combined PRN by decomposing the trees using the seeds based on the combined PRN, etc.).

Figure 6:
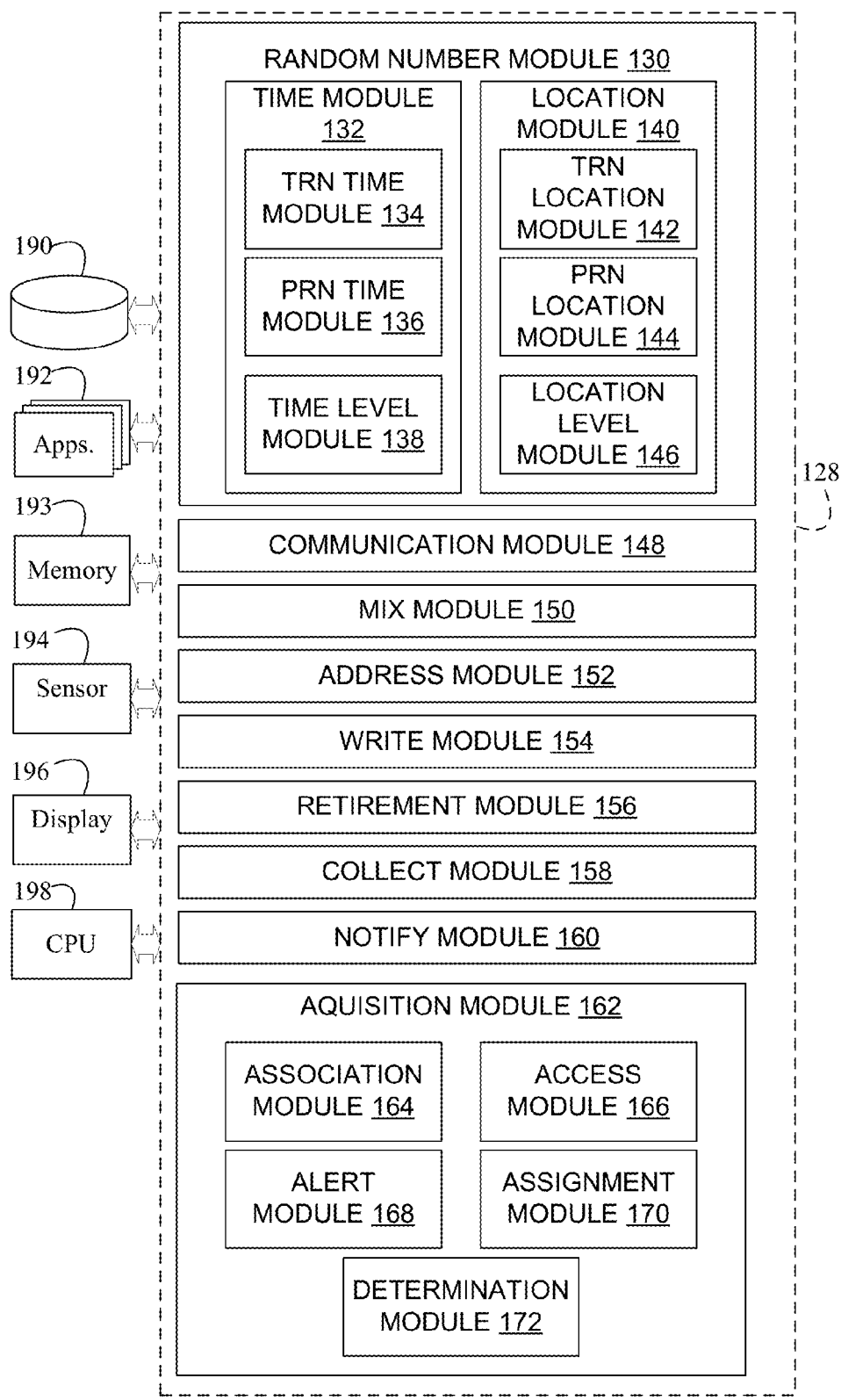
FIG. 6 is a block diagram of an example of a logic architecture according to an embodiment.

Turning now to FIG. 6, an apparatus 126 including logic 128 to temporally and spatially bound time is shown according to an embodiment. The logic architecture 128 may be generally incorporated into a platform such as such as a laptop, personal digital assistant (PDA), wireless smart phone, media player, imaging device, mobile Internet device (MID), any smart device such as a smart phone, smart tablet, smart TV, computer server (e.g., EM server, etc.), wearable computer, and so on, or combinations thereof. The logic architecture 128 may be implemented in an application, operating system, media framework, hardware component, and so on, or combinations thereof. For example, the logic architecture 128 may be implemented in a processor, such as a central processing unit (CPU), a graphical processing unit (GPU), a visual processing unit (VPU), a sensor, an operating system, an application, and so on, or combinations thereof. The apparatus 126 may include and/or interact with storage 190, applications 192, memory 193, sensor 194, display 195, CPU 196, and so on, or combinations thereof.

The illustrated logic architecture 128 includes a random number module 130 having a time module 132 and a location module 140. The time module 132 includes a true random number (TRN) time module 134 to generate a TRN corresponding to time, a pseudo random number (PRN) time module 136 to generate a PRN corresponding to time, and a time level module 138 to generate a tree based on a logical structure of time. In one example, the TRN time module 134 may provide a TRN time seed to the PRN time module 136. Moreover, the time level module 138 may generate a time tree including a plurality of time levels, wherein one or more PRNs may be generated at each level of the plurality of time levels. For example, the PRN time module 136 may generate a first PRN corresponding to time at a first time level and a PRN sequence based on the first PRN, wherein the PRN sequence may include two or more PRNs corresponding to time at a next time level.

The location time module includes a TRN location module 142 to generate a TRN corresponding to location, a PRN location module 144 to generate a PRN corresponding to location, and a location level module 146 to generate a tree based on a logical structure of location. In one example, the TRN location module 142 may provide a TRN location seed (e.g., a different random number than the TRN time seed) to the PRN location module 144. Moreover, the location level module 146 may generate a location tree including a plurality of location levels, wherein one or more PRNs may be generated at each level of the plurality of location levels. For example, the PRN location module 144 may generate a first PRN corresponding to location at a first location level and a PRN sequence based on the first PRN, wherein the PRN sequence may include two or more PRNs corresponding to location at a next location level.

Additionally, the TRN time module 134 may provide a time seed for a time interval and the TRN location module 142 may provide a location seed for a location interval, wherein a user may determine that a specific user is at a specific location at a specific time for times of the time interval and for locations of the location interval. In addition, the PRN location module 144 may provide a PRN corresponding to location based on a location seed, wherein a user is to determine a specific user is at a specific location at a specific time for times of the time interval and for a general space corresponding to locations of the location interval (e.g., for a State corresponding to areas such as cities within the State).

The time level module 138 and/or the location level module 146 may implement a private logical structure to decompose time or location, respectively, in a tree. In addition, the time level module 138 and/or the location level module 146 may utilize a public map to decompose time or location, respectively, in a tree. For example, a public time map may specify information to decompose time based on a common public time seed, a public location map may specify information to decompose location based on a common public location seed, and so on, or combinations thereof. The time level module 138 and/or the location level module 146 may obtain decomposition information via, for example, a communication module 148, the storage 190, and so on, or combinations thereof. The communication module 148 may provide a wide variety of communication functionality, such as cellular telephone (e.g., W-CDMA (UMTS), CDMA2000 (IS-856/IS-2000), etc.), WiFi, Bluetooth (e.g., IEEE 802.15.1-2005, Wireless Personal Area Networks), WiMax (e.g., IEEE 802.16-2004), Global Positioning Systems (GPS), spread spectrum (e.g., 900 MHz), and other radio frequency (RF) telephony purposes.

The logic architecture 128 includes a mix module 150 to mix the PRN corresponding to time with the PRN corresponding to location and generate a combined PRN corresponding to a specific user at a specific location at a specific time. The mix module 146 may execute multi-dimensional entropy multiplexing by implementing an exclusive-OR operation, a hash operation, or a cross product operation, and so on, or combinations thereof. A two-dimensional (2D) matrix may represent the mixing function for mixing two values (e.g., variables), wherein each cell of the 2D matrix may be designated for a different combined PRN. The logic architecture 128 also includes an address module 152 to utilize the combined PRN as a storage address, and/or a write module 154 to write information at the storage address. In one example, the write module 154 may write non-arbitrary information, which may be anonymous. In another example, the write module 154 may write arbitrary information at the storage address, wherein the presence of the arbitrary information may itself indicate the specific user is and/or was at the specific location and at the specific time. Thus, the write module 148 may write to a location defined by only a time PRN, by only a location PRN, by a combined PRN, and so on, or combinations thereof.

The logic architecture 128 includes a retirement module 156 to provide a retirement instruction indicating a period in which information may be available. In one example, the retirement instruction may indicate a time-to-live corresponding to the information that is and/or is to be written. For example, the retirement module 156 may include a specific user-defined and/or pre-determined time-to-live value based on a passage of time from when the information is written, based on a particular time and/or date, and so on, or combinations thereof. Thus, for example, an EM store may clear (e.g., erase, etc.) the information from the storage 190 based on the retirement instruction.

The logic architecture 128 includes a collect module 158 to collect the personal information. For example, the collect module 158 may store the personal information at a storage address in the memory 193. In addition, the collect module 158 may maintain the personal information by updating (e.g., retiring, modifying, adding, etc.) the personal information according to a write event, a read event, an erase event, a retirement instruction, and so on, or combinations thereof. For example, an EM store may implement the retirement instruction to clear the personal information from the memory 193, which may be provided by a specific user (e.g., that provides the information), by the retirement module 156 by another user (e.g., a subscriber, etc.), by the EM store itself and/or the collect module 158 (e.g., using a timer, a first-in-first-out basis, etc.), and so on, or combinations thereof. The logic architecture 128 also includes a notify module 160 to notify one or more other users of an update. For example, the notify module 160 may notify one or more other users that the write module 154 set an indicator bit at a storage address defined by a combined PRN. The notification may be accomplished via, for example, the communication module 148.

The logic architecture 128 includes an acquisition module 162 to acquire personal information (and/or provide the retirement instruction). The acquisition module 162 may, for example, query (e.g., an EM store, etc.) whether a PRN has been used as a storage address, whether a storage address has been written to, and so on, or combinations thereof. The acquisition module 162 may include an association module 164 to associate the combined PRN with an alert component such as, for example, a uniform resource locator (URL). The acquisition module 162 may include an access module 166 to provide the alert component (e.g., the URL) to a service collecting the information at the storage address (e.g., an EM store). The acquisition module 162 may also include an alert module 168 to revive a notification interoperable with the alert component. For example, the alert module 168 may receive a notification in the form of a request (e.g., HTTP request) at the URL from, for example, the notify logic 160 to indicate the specific user is at the specific location at the specific time e.g., when the information is written at the storage address.

The acquisition module 162 may also include an assignment module 170 which may assign a reference such as, for example, a customer number to the specific user. In one example, the access module 166 may provide the customer number and the URL to a service collecting the information, and/or the alert module 168 may receive the request from the service including the customer number and the combined PRN utilized as the storage address. The acquisition module 162 may include a determination module 172 to determine the specific user at the specific location at the specific time based on one or more of the time seed, the location seed, and the combined PRN. It should be understood that the acquisition module 162 may, for example, subscribe time PRNs alone, location PRNs alone, and so on, wherein a notification may be provided in the event that any of the subscribed PRNs are utilized.

The logic architecture 128 may also include a user interface module (not shown) to provide any desired interface, such as a graphical user interface, a command line interface, and so on, or combinations thereof. The user interface module may provide access to one or more settings associated with temporal and/or location bounding. The settings may include options to define, for example, PRN software/hardware, PRN instructions, public maps, ad hoc information, personal information to be shared, PRNs to be shared, personal information to be consumed, mixing functions, subscriber instructions, services of interest, services to be provided, retirement instructions, and so on, or combinations thereof. While examples have shown separate logic for illustration purposes, it is should be understood that one or more of the modules of the logic architecture 128 may be implemented in one or more combined modules, such as a single logic including one or more of the time module 132, location module 140, communication module 148, mix module 150, address module 152, write module 154, retirement module 156, collect module 158, notify module 160, acquisition module 162, components thereof, and so on. In addition, it should be understood that one or more logic components of the apparatus 126 may be on platform, off platform, and/or reside in the same or different real and/or virtual space as the apparatus 126. For example, the PRN time module 136 may be implemented in the same software and/or hardware as the PRN location module 144, which may be the same or different software and/or hardware as the collect module 158. Accordingly, the logic may be functionally separate logic, processes, and/or threads, may run on the same computing device and/or distributed across multiple devices to run concurrently, simultaneously, in parallel, and/or sequentially, may be combined into one or more independent logic blocks or executables, and/or are described as separate components for ease of illustration.

Figure 7:
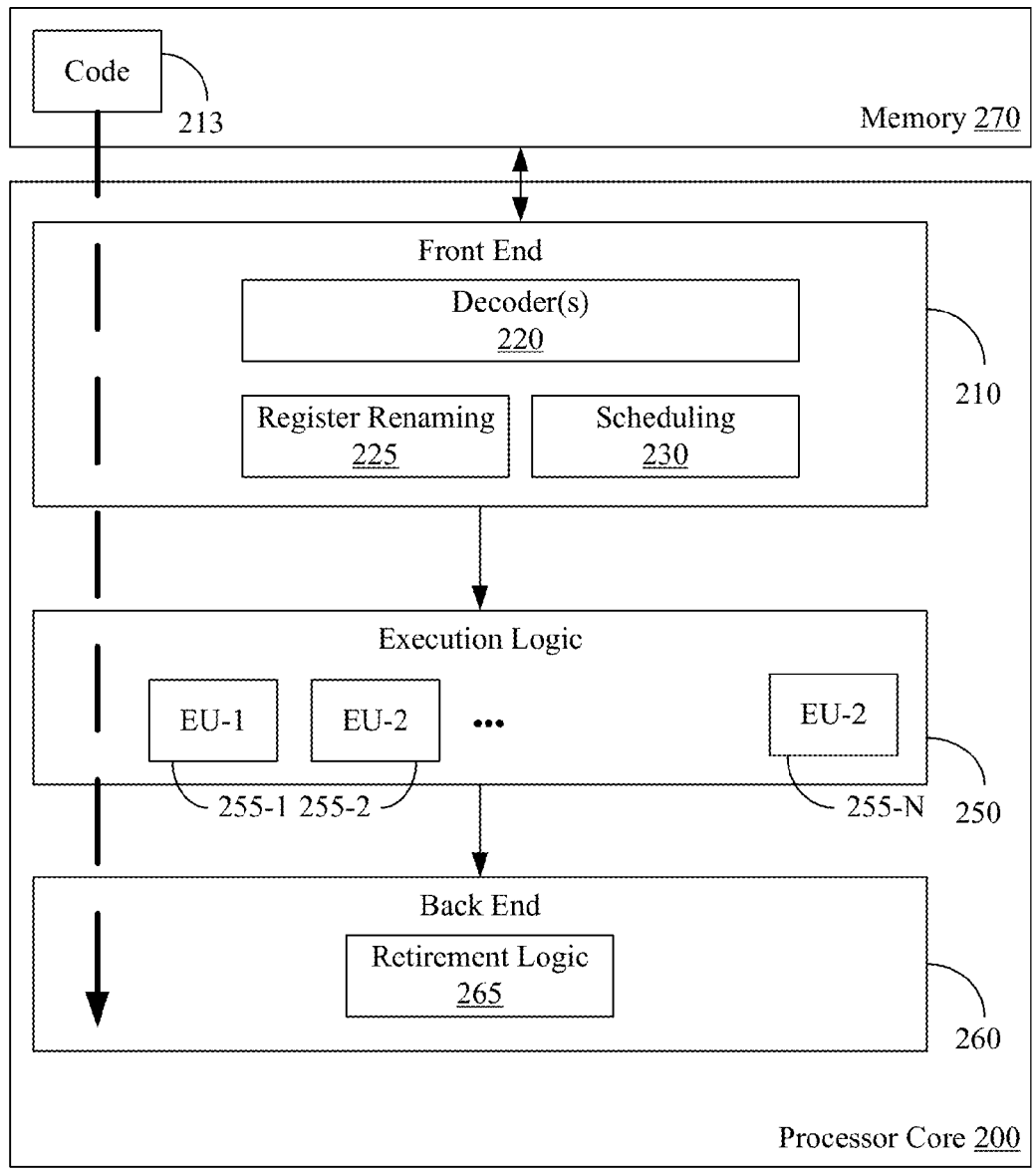
FIG. 7 is a block diagram of an example of a processor according to an embodiment.

Turning now to FIG. 7, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the architectures 10, 22 (FIGS. 1A and 1B), 38, 50 (FIGS. 2A and 2B), 62, 70 (FIGS. 3A and 3B), 128 (FIG. 6), the mixing function represented by the matrix 82 (FIG. 4), and/or the method 110 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 8:
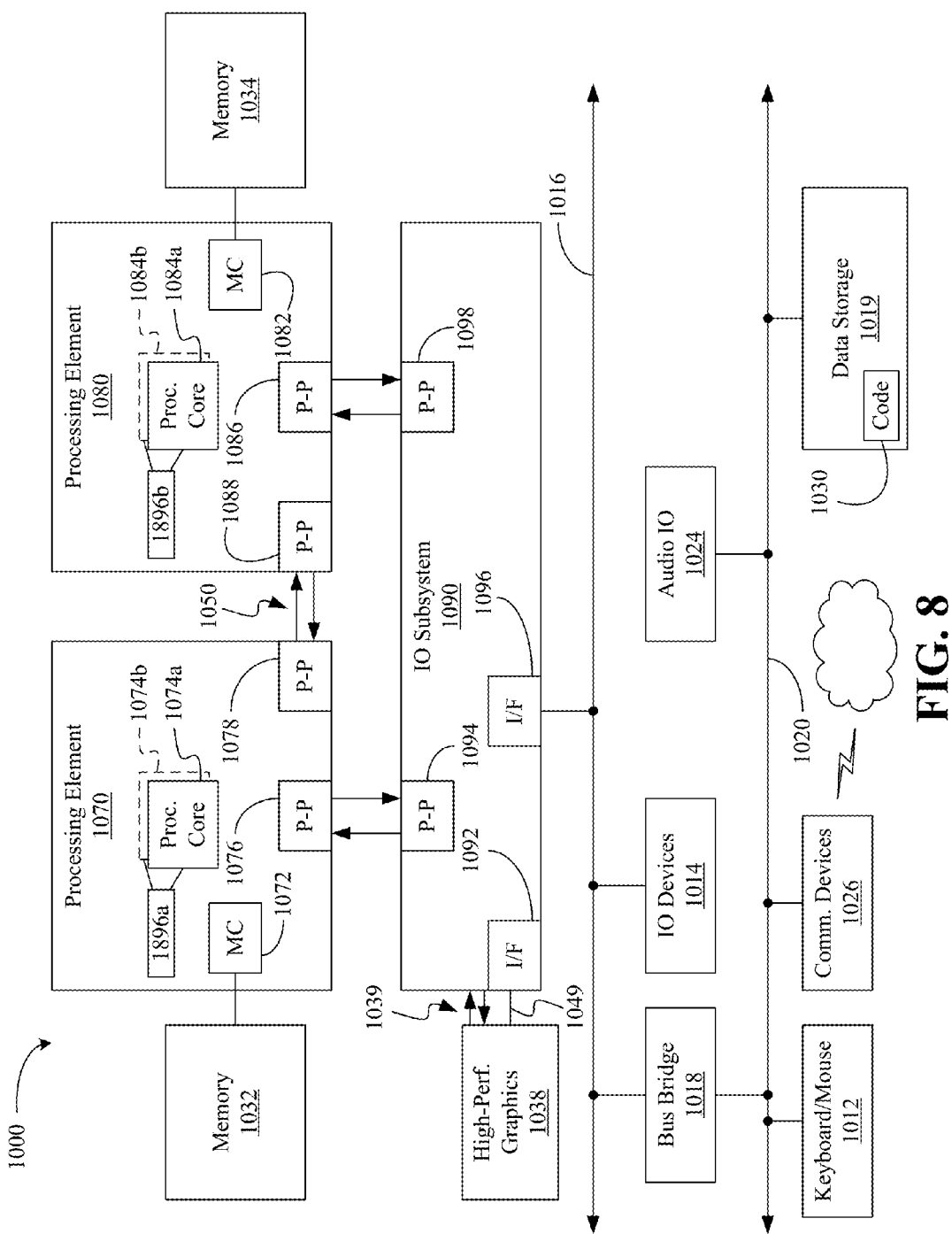
FIG. 8 is a block diagram of an example of a system according to an embodiment.

FIG. 8 shows a block diagram of a system 1000 in accordance with an embodiment. Shown in FIG. 8 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 7.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope is not so limited.

As shown in FIG. 8, various I/O devices 1014 such as the display 196 (FIG. 6), a true random number generator, a pseudo random number generator, etc. may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the architectures 10, 22 (FIGS. 1A and 1B), 38, 50 (FIGS. 2A and 2B), 62, 70 (FIGS. 3A and 3B), 128 (FIG. 6), the mixing function represented by the matrix 82 (FIG. 4), and/or the method 110 (FIG. 5), already discussed. Further, an audio I/O 1024 may be coupled to second bus 1020.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Additional Notes and Examples

Examples may include subject matter such as a method, means for performing acts of the method, at least one machine-readable medium including instructions that, when performed by a machine cause the machine to performs acts of the method, or an apparatus or system to temporally and spatially bound information according to embodiments and examples described herein.

Example 1 may include an apparatus comprising a time module to generate a pseudo random number corresponding to time based on a random number time seed. The apparatus may also include a location module to generate a pseudo random number corresponding to location based on a random number location seed. The apparatus may include a mix module to mix the pseudo random number corresponding to time with the pseudo random number corresponding to location to generate a combined pseudo random number corresponding to a specific user at a specific location at a specific time.

Example 2 may include the subject matter of Example 1 and further optionally may include a time level module to generate a time tree including a plurality of time levels, wherein one or more pseudo random numbers is to be generated at each of the plurality of time levels, and/or a location level module to generate a location tree including a plurality of location levels, wherein one or more pseudo random numbers is to be generated at each level of the plurality of location levels.

Example 3 may include the subject matter of any of Example 1 to Example 2 and further optionally may include a pseudo random number time module to generate a first pseudo random number corresponding to time at a first time level and a pseudo random number sequence based on the first pseudo random number, wherein the pseudo random number sequence is to include two or more pseudo random numbers corresponding to time at a next time level, and/or a pseudo random number location module to generate a first pseudo random number corresponding to location at a first location level and a pseudo random number sequence based on the first pseudo random number, wherein the pseudo random number sequence is to include two or more pseudo random numbers corresponding to location at a next location level.

Example 4 may include the subject matter of any of Example 1 to Example 3 and further optionally may include, wherein one or more of the time level module is to decompose time based on a public time map shared by a plurality of users and/or the location level module is to decompose location based on a public location map shared by a plurality of users, the public time map specifying information to decompose time based on a common public time seed and the public location map specifying information to decompose location based on a common public location seed.

Example 5 may include the subject matter of any of Example 1 to Example 4 and further optionally may include a true random number time module to provide a time seed for a time interval and a true random number location module to provide a location seed for a location interval, wherein a user is to determine that a specific user is at a specific location at a specific time for times of the time interval and for locations of the location interval, and/or a pseudo random number location module to provide a pseudo random number corresponding to location based on a location seed for a location interval, wherein a user is to determine a specific user is at a specific location at a specific time for times of the time interval and for a general space corresponding to locations of the location interval.

Example 6 may include the subject matter of any of Example 1 to Example 5 and further optionally may include implementing the combined pseudo random to provide a service, wherein the service is to include one or more of a user tracking service, a location sharing service, a cloud service, and a sale of location information service.

Example 7 may include the subject matter of any of Example 1 to Example 6 and further optionally may include the mix module to implement one or more of an exclusive-OR operation, a hash operation, or a cross product operation to execute multi-dimensional entropy multiplexing.

Example 8 may include the subject matter of any of Example 1 to Example 7 and further optionally may include an address module to utilize the combined pseudo random number as a storage address, and/or a write module to write information at the storage address.

Example 9 may include the subject matter of any of Example 1 to Example 8 and further optionally may include the write module is to write arbitrary information at the storage address, the presence of the arbitrary information to indicate the specific user is at the specific location and at the specific time.

Example 10 may include the subject matter of any of Example 1 to Example 9 and further optionally may include an association module to associate the combined pseudo random number with a uniform resource locator, an access module to provide the uniform resource locator to a service collecting the information at the storage address, and/or an alert module to receive a request at the uniform resource locator from the service to indicate the specific user is at the specific location at the specific time when the information is written at the storage address.

Example 11 may include the subject matter of any of Example 1 to Example 10 and further optionally may include an assignment module to assign a customer number to the specific user, wherein the access module is to provide the customer number and the uniform resource locator to the service, and/or wherein the alert module is to receive the request from the service including the customer number and the combined pseudo random number utilized as the storage address, and/or a determination module to determine the specific user at the specific location at the specific time based on one or more of the time seed, the location seed, or the combined pseudo random number.

Example 12 may include the subject matter of any of Example 1 to Example 11 and further optionally may include an acquisition module to poll a service collecting the information at the storage address using the combined pseudo random number to determine if the specific user is at the specific location at the specific time.

Example 13 may include the subject matter of any of Example 1 to Example 12 and further optionally may include a retirement module to provide a retirement instruction to the service collecting the information to clear the information.

Example 14 may include the subject matter of any of Example 1 to Example 13 and further optionally may include the location is to include one or more of a semantic location and/or a geographic location.

Example 15 may include a method to temporally and spatially bound information, comprising generating a pseudo random number corresponding to time based on a random number time seed. The method may also include generating a pseudo random number corresponding to location based on a random number location seed. The method may include mixing the pseudo random number corresponding to time with the pseudo random number corresponding to location to generate a combined pseudo random number corresponding to a specific user at a specific location at a specific time Example 16 may include the subject matter of Example 15 and further optionally may include generating a time tree including a plurality of time levels, wherein one or more pseudo random numbers is generated at each of the plurality of time levels, and/or generating a location tree including a plurality of location levels, wherein one or more pseudo random numbers is generated at each level of the plurality of location levels.

Example 17 may include the subject matter of any of Example 15 to Example 16 and further optionally may include generating a first pseudo random number corresponding to time at a first time level and a pseudo random number sequence based on the first pseudo random number, wherein the pseudo random number sequence includes two or more pseudo random numbers corresponding to time at a next time level, and/or generating a first pseudo random number corresponding to location at a first location level and a pseudo random number sequence based on the first pseudo random number, wherein the pseudo random number sequence includes two or more pseudo random numbers corresponding to location at a next location level.

Example 18 may include the subject matter of any of Example 15 to Example 17 and further optionally may include one or more of decomposing time based on a public time map shared by a plurality of users and/or location based on a public location map shared by a plurality of users, the public time map specifying information to decompose time based on a common public time seed and the public location map specifying information to decompose location based on a common public location seed.

Example 19 may include the subject matter of any of Example 15 to Example 18 and further optionally may include providing a time seed for a time interval and a location seed for a location interval, wherein a user determines that a specific user is at a specific location at a specific time for times of the time interval and for locations of the location interval, and/or provide a pseudo random number corresponding to location based on a location seed for a location interval, wherein a user determines a specific user is at a specific location at a specific time for times of the time interval and for a general space corresponding to locations of the location interval.

Example 20 may include the subject matter of any of Example 15 to Example 19 and further optionally may include implementing the to provide a service, wherein the service includes one or more of a user tracking service, a location sharing service, a cloud service, and a sale of location information service.

Example 21 may include the subject matter of any of Example 15 to Example 20 and further optionally may include implementing one or more of an exclusive-OR operation, a hash operation, or a cross product operation to execute multi-dimensional entropy multiplexing.

Example 22 may include the subject matter of any of Example 15 to Example 21 and further optionally may include utilizing the combined pseudo random number as a storage address, and/or writing information at the storage address.

Example 23 may include the subject matter of any of Example 15 to Example 22 and further optionally may include writing arbitrary information at the storage address, the presence of the arbitrary information indicating the specific user is at the specific location and at the specific time.

Example 24 may include the subject matter of any of Example 15 to Example 23 and further optionally may include associating the combined pseudo random number with a uniform resource locator, providing the uniform resource locator to a service collecting the information at the storage address, and/or receiving a request at the uniform resource locator from the service to indicate the specific user is at the specific location at the specific time when the information is written at the storage address.

Example 25 may include the subject matter of any of Example 15 to Example 24 and further optionally may include assigning a customer number to the specific user, providing the customer number and the uniform resource locator to the service, receiving the request from the service including the customer number and the combined pseudo random number utilized as the storage address, and/or determining the specific user at the specific location at the specific time based on one or more of the time seed, the location seed, or the combined pseudo random number.

Example 26 may include the subject matter of any of Example 15 to Example 25 and further optionally may include polling a service collecting the information at the storage address using the combined pseudo random number to determine if the specific user is at the specific location at the specific time.

Example 27 may include the subject matter of any of Example 15 to Example 26 and further optionally may include providing a retirement instruction to a service collecting the information to clear the information.

Example 28 may include the subject matter of any of Example 15 to Example 27 and further optionally may include the location including one or more of a semantic location and/or a geographic location.

Example 29 may include at least one computer readable storage medium comprising one or more instructions that when executed on a computing device cause the computing device to generate a pseudo random number corresponding to time based on a random number time seed, generate a pseudo random number corresponding to location based on a random number location seed, and/or mix the pseudo random number corresponding to time with the pseudo random number corresponding to location to generate a combined pseudo random number corresponding to a specific user at a specific location at a specific time.

Example 30 may include the subject matter of Example 29 and further optionally may include when executed the one or more instructions cause the computing device to generate a time tree including a plurality of time levels, wherein one or more pseudo random numbers is to be generated at each of the plurality of time levels, and/or generate a location tree including a plurality of location levels, wherein one or more pseudo random numbers is to be generated at each level of the plurality of location levels.

Example 31 may include the subject matter of any of Example 29 to Example 30 and further optionally may include when executed the one or more instructions cause the computing device to generate a first pseudo random number corresponding to time at a first time level and a pseudo random number sequence based on the first pseudo random number, wherein the pseudo random number sequence is to include two or more pseudo random numbers corresponding to time at a next time level, and/or generate a first pseudo random number corresponding to location at a first location level and a pseudo random number sequence based on the first pseudo random number, wherein the pseudo random number sequence is to include two or more pseudo random numbers corresponding to location at a next location level.

Example 32 may include the subject matter of any of Example 29 to Example 31 and further optionally may include when executed the one or more instructions cause the computing device to decompose time based on a public time map shared by a plurality of users, and/or decompose location based on a public location map shared by a plurality of users, the public time map specifying information to decompose time based on a common public time seed and the public location map specifying information to decompose location based on a common public location seed.

Example 33 may include the subject matter of any of Example 29 to Example 32 and further optionally may include when executed the one or more instructions cause the computing device to provide a time seed for a time interval and provide a location seed for a location interval, wherein a user is to determine that a specific user is at a specific location at a specific time for times of the time interval and for locations of the location interval, and/or provide a pseudo random number corresponding to location based on a location seed for a location interval, wherein a user is to determine a specific user is at a specific location at a specific time for times of the time interval and for a general space corresponding to locations of the location interval.

Example 34 may include the subject matter of any of Example 29 to Example 33 and further optionally may include when executed the one or more instructions cause the computing device to implement the combined pseudo random number to provide a service, wherein the service is to include one or more of a user tracking service, a location sharing service, a cloud service, and a sale of location information service.

Example 35 may include the subject matter of any of Example 29 to Example 34 and further optionally may include when executed the one or more instructions cause the computing device to implement one or more of an exclusive-OR operation, a hash operation, and/or a cross product operation to execute multi-dimensional entropy multiplexing.

Example 36 may include the subject matter of any of Example 29 to Example 35 and further optionally may include when executed the one or more instructions cause the computing device to utilize the combined pseudo random number as a storage address, and/or write information at the storage address.

Example 37 may include the subject matter of any of Example 29 to Example 36 and further optionally may include when executed the one or more instructions cause the computing device to write arbitrary information at the storage address, the presence of the arbitrary information to indicate the specific user is at the specific location and at the specific time.

Example 38 may include the subject matter of any of Example 29 to Example 37 and further optionally may include when executed the one or more instructions cause the computing device to associate the combined pseudo random number with a uniform resource locator, provide the uniform resource locator to a service collecting the information at the storage address, and/or receive a request at the uniform resource locator from the service to indicate the specific user is at the specific location at the specific time when the information is written at the storage address.

Example 39 may include the subject matter of any of Example 29 to Example 38 and further optionally may include when executed the one or more instructions cause the computing device to assign a customer number to the specific user, provide the customer number and the uniform resource locator to the service, receive the request from the service including the customer number and the combined pseudo random number utilized as the storage address, and/or determine the specific user at the specific location at the specific time based on one or more of the time seed, the location seed, or the combined pseudo random number.

Example 40 may include the subject matter of any of Example 29 to Example 39 and further optionally may include when executed the one or more instructions cause the computing device to poll a service collecting the information at the storage address using the combined pseudo random number to determine if the specific user is at the specific location at the specific time.

Example 41 may include the subject matter of any of Example 29 to Example 40 and further optionally may include when executed the one or more instructions cause the computing device to provide a retirement instruction to a service collecting the information to clear the information.

Example 42 may include the subject matter of any of Example 29 to Example 41 and further optionally may include the location is to include one or more of a semantic location and/or a geographic location.

Example 43 may include an apparatus to temporally and spatially bound information apparatus comprising means for generating a pseudo random number corresponding to time based on a random number time seed. The apparatus may also include means for generating a pseudo random number corresponding to location based on a random number location seed. The apparatus may include means for mixing the pseudo random number corresponding to time with the pseudo random number corresponding to location to generate a combined pseudo random number corresponding to a specific user at a specific location at a specific time.

Example 44 may include the subject matter of Example 43 and further optionally may include means for generating a time tree including a plurality of time levels, wherein one or more pseudo random numbers is generated at each of the plurality of time levels, and/or means for generating a location tree including a plurality of location levels, wherein one or more pseudo random numbers is generated at each level of the plurality of location levels.

Example 45 may include the subject matter of any of Example 43 to Example 44 and further optionally may include means for generating a first pseudo random number corresponding to time at a first time level and a pseudo random number sequence based on the first pseudo random number, wherein the pseudo random number sequence includes two or more pseudo random numbers corresponding to time at a next time level, and/or means for generating a first pseudo random number corresponding to location at a first location level and a pseudo random number sequence based on the first pseudo random number, wherein the pseudo random number sequence includes two or more pseudo random numbers corresponding to location at a next location level.

Example 46 may include the subject matter of any of Example 43 to Example 45 and further optionally may include means for decomposing time based on a public time map shared by a plurality of users, and/or means for decomposing location based on a public location map shared by a plurality of users, the public time map specifying information to decompose time based on a common public time seed and the public location map specifying information to decompose location based on a common public location seed.

Example 47 may include the subject matter of any of Example 43 to Example 46 and further optionally may include means for providing a time seed for a time interval and a location seed for a location interval, wherein a user determines that a specific user is at a specific location at a specific time for times of the time interval and for locations of the location interval, and/or means for providing a pseudo random number corresponding to location based on a location seed for a location interval, wherein a user determines a specific user is at a specific location at a specific time for times of the time interval and for a general space corresponding to locations of the location interval.

Example 48 may include the subject matter of any of Example 43 to Example 47 and further optionally may include means for implementing the combined pseudo random number to provide a service, wherein the service includes one or more of a user tracking service, a location sharing service, a cloud service, and a sale of location information service.

Example 49 may include the subject matter of any of Example 43 to Example 48 and further optionally may include means for implementing one or more of an exclusive-OR operation, a hash operation, or a cross product operation to execute multi-dimensional entropy multiplexing.

Example 50 may include the subject matter of any of Example 43 to Example 49 and further optionally may include means for utilizing the combined pseudo random number as a storage address, and/or means for writing information at the storage address.

Example 51 may include the subject matter of any of Example 43 to Example 50 and further optionally may include means for writing arbitrary information at the storage address, the presence of the arbitrary information indicating the specific user is at the specific location and at the specific time.

Example 52 may include the subject matter of any of Example 43 to Example 51 and further optionally may include means for associating the combined pseudo random number with a uniform resource locator, means for providing the uniform resource locator to a service collecting the information at the storage address, and/or means for receiving a request at the uniform resource locator from the service to indicate the specific user is at the specific location at the specific time when the information is written at the storage address.

Example 53 may include the subject matter of any of Example 43 to Example 52 and further optionally may include means for assigning a customer number to the specific user, means for providing the customer number and the uniform resource locator to the service, means for receiving the request from the service including the customer number and the combined pseudo random number utilized as the storage address, and/or means for determining the specific user at the specific location at the specific time based on one or more of the time seed, the location seed, or the combined pseudo random number.

Example 54 may include the subject matter of any of Example 43 to Example 53 and further optionally may include means for polling a service collecting the information at the storage address using the combined pseudo random number to determine if the specific user is at the specific location at the specific time.

Example 55 may include the subject matter of any of Example 43 to Example 54 and further optionally may include means for providing a retirement instruction to a service collecting the information to clear the information.

Example 56 may include the subject matter of any of Example 43 to Example 55 and further optionally may include the location is to include one or more of a semantic location and/or a geographic location.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the terms "one or more of" and "at least one of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, the specification, and following claims.

We claim:

1. An apparatus configured to:
   generate a pseudo random number corresponding to time based on a random number time seed at a first time level and a pseudo random number sequence based on the pseudo random number corresponding to time, wherein the pseudo random number sequence based on the pseudo random number corresponding to time is to include two or more pseudo random numbers corresponding to time at a next time level;
   generate a pseudo random number corresponding to location based on a random number location seed at a first location level and a pseudo random number sequence based on the pseudo random number corresponding to location, wherein the pseudo random number sequence based on the pseudo random number corresponding to location is to include two or more pseudo random numbers corresponding to location at a next location level; and
   mix a pseudo random number corresponding to time with a pseudo random number corresponding to location to generate a combined pseudo random number corresponding to a specific user at a specific location at a specific time.

2. The apparatus of claim 1, wherein the apparatus is to be further configured to:
   generate a time tree including a plurality of time levels, wherein one or more pseudo random numbers is to be generated at each of the plurality of time levels; and
   generate a location tree including a plurality of location levels, wherein one or more pseudo random numbers is to be generated at each level of the plurality of location levels.

3. The apparatus of claim 2, wherein the apparatus is to be further configured to one or more of:
   decompose time based on a public time map shared by a plurality of users, the public time map specifying information to decompose time based on a common public time seed; or
   decompose location based on a public location map shared by a plurality of users, the public location map specifying information to decompose location based on a common public location seed.

4. The apparatus of claim 1, wherein the apparatus is to be further configured to one or more of:
   provide a time seed for a time interval and a location seed for a location interval, wherein a user is to determine that a specific user is at a specific location at a specific time for times of the time interval and for locations of the location interval; or
   provide a time seed for a time interval and a pseudo random number corresponding to location based on a location seed for a location interval, wherein a user is to determine a specific user is at a specific location at a specific time for times of the time interval and for a general space corresponding to locations of the location interval.

5. The apparatus of claim 1, wherein the apparatus is to be further configured to implement the combined pseudo random number to provide a service, wherein the service is to include one or more of a user tracking service, a location sharing service, a cloud service, and a sale of location information service.

6. The apparatus of claim 1, wherein the apparatus is to be further configured to implement one or more of an exclusive-OR operation, a hash operation, or a cross product operation to execute multi-dimensional entropy multiplexing.

7. The apparatus of claim 1, wherein the apparatus is to be further configured to:
   utilize the combined pseudo random number as a storage address; and
   write information at the storage address.

8. The apparatus of claim 7, wherein the apparatus is to be further configured to write arbitrary information at the storage address, the presence of the arbitrary information to indicate the specific user is at the specific location and at the specific time.

9. The apparatus of claim 7, wherein the apparatus is to be further configured to:
   associate the combined pseudo random number with a uniform resource locator;
   provide the uniform resource locator to a service collecting the information at the storage address; and
   receive a request at the uniform resource locator from the service to indicate the specific user is at the specific location at the specific time when the information is written at the storage address.

10. The apparatus of claim 9, wherein the apparatus is to be further configured to:
    assign a customer number to the specific user
    provide the customer number and the uniform resource locator to the service
    receive the request from the service including the customer number and the combined pseudo random number utilized as the storage address; and
    determine the specific user at the specific location at the specific time based on one or more of the time seed, the location seed, or the combined pseudo random number.

11. The apparatus of claim 7, wherein the apparatus is to be further configured to poll a service collecting the information at the storage address using the combined pseudo random number to determine if the specific user is at the specific location at the specific time.

12. The apparatus of claim 7, wherein the apparatus is to be further configured to provide a retirement instruction to a service collecting the information to clear the information.

13. The apparatus of claim 1, wherein the location is to include one or more of a semantic location or a geographic location.

14. A method comprising:
    generating a pseudo random number corresponding to time based on a random number time seed at a first time level and a pseudo random number sequence based on the pseudo random number corresponding to time, wherein the pseudo random number sequence based on the pseudo random number corresponding to time includes two or more pseudo random numbers corresponding to time at a next time level;

generating a pseudo random number corresponding to location based on a random number location seed at a first location level and a pseudo random number sequence based on the pseudo random number corresponding to location, wherein the pseudo random number sequence based on the pseudo random number corresponding to location includes two or more pseudo random numbers corresponding to location at a next location level; and mixing a pseudo random number corresponding to time with a pseudo random number corresponding to location to generate a combined pseudo random number corresponding to a specific user at a specific location at a specific time.

15. The method of claim 14, further including one or more of:

providing a time seed for a time interval and a location seed for a location interval, wherein a user determines that a specific user is at a specific location at a specific time for times of the time interval and for locations of the location interval; or providing a time seed for a time interval and a pseudo random number corresponding to location based on a location seed for a location interval, wherein a user determines a specific user is at a specific location at a specific time for times of the time interval and for a general space corresponding to locations of the location interval.

16. The method of claim 14, further including implementing the combined pseudo random number to provide a service, wherein the service includes one or more of a user tracking service, a location sharing service, a cloud service, and a sale of location information service.

17. The method of claim 14, further including:

utilizing the combined pseudo random number as a storage address; and writing information at the storage address.

18. The method of claim 17, further including:

associating the combined pseudo random number with a uniform resource locator;

providing the uniform resource locator to a service collecting the information at the storage address; and receiving a request at the uniform resource locator from the service to indicate the specific user is at the specific location at the specific time when the information is written at the storage address.

19. At least one non-transitory computer-readable medium comprising one or more instructions that when executed on a computing device cause the computing device to:

generate a pseudo random number corresponding to time based on a random number time seed at a first time level and a pseudo random number sequence based on the pseudo random number corresponding to time, wherein the pseudo random number sequence based on the pseudo random number corresponding to time is to include two or more pseudo random numbers corresponding to time at a next time level;

generate a pseudo random number corresponding to location based on a random number location seed at a first location level and a pseudo random number sequence based on the pseudo random number corresponding to location, wherein the pseudo random number sequence based on the pseudo random number corresponding to location is to include two or more pseudo random numbers corresponding to location at a next location level; and mix a pseudo random number corresponding to time with a pseudo random number corresponding to location to generate a combined pseudo random number corresponding to a specific user at a specific location at a specific time.

20. The at least one non-transitory medium of claim 19, wherein when executed the one or more instructions cause the computing device to one or more of:

provide a time seed for a time interval and a location seed for a location interval, wherein a user is to determine that a specific user is at a specific location at a specific time for times of the time interval and for locations of the location interval; or provide a time seed for a time interval and a pseudo random number corresponding to location based on a location seed for a location interval, wherein a user is to determine a specific user is at a specific location at a specific time for times of the time interval and for a general space corresponding to locations of the location interval.

21. The at least one non-transitory medium of claim 19, wherein when executed the one or more instructions cause the computing device to implement the combined pseudo random number to provide a service, wherein the service is to include one or more of a user tracking service, a location sharing service, a cloud service, and a sale of location information service.

22. The at least one non-transitory medium of claim 19, wherein when executed the one or more instructions cause the computing device to:

utilize the combined pseudo random number as a storage address; and write information at the storage address.

23. The at least one non-transitory medium of claim 22, wherein when executed the one or more instructions cause the computing device to:

associate the combined pseudo random number with a uniform resource locator;

provide the uniform resource locator to a service collecting the information at the storage address; and receive a request at the uniform resource locator from the service to indicate the specific user is at the specific location at the specific time when the information is written at the storage address.

* * * * *